US011930548B2

(12) United States Patent
Alam et al.

(10) Patent No.: US 11,930,548 B2
(45) Date of Patent: Mar. 12, 2024

(54) ESTABLISHING MULTIPLE INFRASTRUCTURE CONNECTIONS TO MULTIPLE ACCESS POINTS VIA A SINGLE WIRELESS NETWORK INTERFACE CONTROLLER

(71) Applicant: Microsoft Technology Licensing, LLC, Redmond, WA (US)

(72) Inventors: Mohammad Shabbir Alam, Redmond, WA (US); Dhanya Krishnan Nair, Redmond, WA (US); Gianluigi Nusca, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 141 days.

(21) Appl. No.: 17/408,408

(22) Filed: Aug. 21, 2021

(65) Prior Publication Data
US 2022/0418017 A1 Dec. 29, 2022

Related U.S. Application Data

(60) Provisional application No. 63/214,222, filed on Jun. 23, 2021.

(51) Int. Cl.
*H04W 76/15* (2018.01)
*H04W 24/08* (2009.01)
*H04W 76/30* (2018.01)

(52) U.S. Cl.
CPC .......... *H04W 76/15* (2018.02); *H04W 24/08* (2013.01); *H04W 76/30* (2018.02)

(58) Field of Classification Search
CPC ..... H04W 76/15; H04W 24/08; H04W 76/30; H04W 76/14; H04W 76/19; H04W 48/20
See application file for complete search history.

(56) References Cited

U.S. PATENT DOCUMENTS

| 8,976,735 B1 | 3/2015 | Shmidt |
| 2012/0072751 A1 | 3/2012 | Das et al. |

(Continued)

FOREIGN PATENT DOCUMENTS

| CN | 110636641 A | * 12/2019 | ............ H04W 48/20 |
| WO | WO-2020259811 A1 | * 12/2020 | |

OTHER PUBLICATIONS

"Can I Use Multiple USB Wifi Adapters on My Laptop to Connect to Separate ISP Routers?", Retrieved from: https://www.quora.com/Can-I-use-multiple-USB-wifi-adapters-on-my-laptop-to-connect-to-separate-ISP-routers, Retrieved Date: Jun. 22, 2020, 12 Pages.

(Continued)

*Primary Examiner* — Said M Elnoubi
(74) *Attorney, Agent, or Firm* — Wade IP Law PLLC

(57) ABSTRACT

Techniques are described herein that are capable of establishing multiple infrastructure connections to multiple access points via a single wireless network interface controller (WNIC). Capability information is analyzed to determine combination(s) of identified frequency bands over which the WNIC is capable of communicating simultaneously. Availability information is analyzed to determine signal qualities associated with respective available frequency bands. A primary infrastructure connection is established to a first access point via the WNIC based at least in part on a first frequency band associated with the first access point being included among the identified frequency bands and being associated with a relatively high signal quality. A secondary infrastructure connection is established to a second access point via the WNIC based at least in part on a second frequency band associated with the second access point being included among the identified frequency bands in a combination that includes the first frequency band.

20 Claims, 9 Drawing Sheets

(56) References Cited

U.S. PATENT DOCUMENTS

| | | | |
|---|---|---|---|
| 2013/0065557 A1* | 3/2013 | Zhang | H04W 12/04 455/411 |
| 2016/0234179 A1 | 8/2016 | Gatewood et al. | |
| 2016/0241702 A1 | 8/2016 | Gorajala Chandra et al. | |
| 2019/0166629 A1* | 5/2019 | Gassend | H04W 76/00 |
| 2019/0327672 A1 | 10/2019 | Hwang et al. | |
| 2023/0054451 A1* | 2/2023 | Li | H04W 76/15 |

OTHER PUBLICATIONS

"How Do I Manage Connections in Speedify?", Retrieved from: https://web.archive.org/web/20201001192610/https:/support.speedify.com/article/236-connection-settings, Oct. 1, 2020, 5 Pages.

"How to Change the Network Connection Priority in Windows 7", Retrieved from: https://web.archive.org/web/20210125005144/https:/support.microsoft.com/en-us/topic/how-to-change-the-network-connection-priority-in-windows-7-546c0249-1ade-367a-570f-de2f17bda23d, Jan. 25, 2021, 7 Pages.

"How to Change to Multiple WiFi Adapters in Windows 10", Retrieved from: https://www.drivethelife.com/windows-10/change-to-multiple-wifi-adapters-in-windows-10.html, Sep. 13, 2018, 7 Pages.

"How to Combine 2 (or More) Wi-Fi Connections on a PC", Retrieved from: https://www.youtube.com/watch?v=STydSct2_8s, Aug. 28, 2020, 3 Pages.

Bahl, et al., "MultiNet: Connecting to Multiple IEEE 802.11 Networks Using a Single Wireless Card", In Technical Report MSR-TR-2003-46, Aug. 2003, 22 Pages.

Gizis, Alex, "How to Combine Multiple Internet Connections", Retrieved from: https://speedify.com/blog/combining-internet-connections/how-to-combine-multiple-internet-connections/, Jun. 9, 2017, 6 Pages.

"Qualcomm Announces Strategic Cooperation with Tencent Games", Retrieved from: https://www.qualcomm.com/news/releases/2019/07/29/qualcomm-announces-strategic-cooperation-tencent-games, Jul. 29, 2019, 3 Pages.

"Intel at the Olympic Games", Retrieved from: https://www.intel.com/content/www/us/en/homepage.html?ref=https://www.intel.com/content/www/us/en/products/docs/wireless/killer/doubleshot-pro.htm, Retrieved Date: Jun. 16, 2021, 6 Pages.

"International Search Report and Written Opinion Issued in PCT Application No. PCT/US22/029110", dated Sep. 20, 2022, 15 Pages.

\* cited by examiner

ESTABLISHING MULTIPLE INFRASTRUCTURE CONNECTIONS TO MULTIPLE ACCESS POINTS VIA A SINGLE WIRELESS NETWORK INTERFACE CONTROLLER

CROSS-REFERENCE TO RELATED APPLICATION(S)

This application claims the benefit of U.S. Provisional Application No. 63/214,222, filed Jun. 23, 2021 and entitled "Establishing Multiple Infrastructure Connections to Multiple Access Points Via a Single Wireless Network Interface Controller," the entirety of which is incorporated herein by reference.

BACKGROUND

A network interface controller (NIC) is a hardware component that enables a computing device to communicate over a computer network. A wireless network interface controller (WNIC) is a network interface controller that enables a computing device to communicate over a wireless computer network. For instance, the WNIC may include electrical circuitry that is configured to facilitate communication between the computing device and an access point in accordance with wireless communication standard(s), such as any of the IEEE 802.11 standards which are developed and maintained by the Institute of Electrical and Electronics Engineers (IEEE) LAN/MAN Standards Committee. An access point is a networking hardware component that is configured to connect a wireless computer network to a wired computer network.

Modern computing devices often include an operating system and a WNIC. Traditionally, the operating system interacts with the WNIC to establish a single infrastructure connection to a single access point. If a second infrastructure connection is desired, the computing device traditionally includes a second WNIC, and the operating system interacts with the second WNIC to establish the second infrastructure connection to a second access point. However, addition of a second WNIC to a computing device typically increases space, complexity, power requirements, and cost (e.g., bill of materials cost) of the computing device. Moreover, applications that execute on the computing device may not be able to determine which of the infrastructure connections has better link quality.

SUMMARY

Various approaches are described herein for, among other things, establishing multiple infrastructure connections to multiple access points via a single wireless network interface controller (WNIC). An infrastructure connection is a connection between a computing device and an access point. An access point is a networking hardware component that connects a wireless computer network to a wired computer network. For example, the access point may provide information received from the wireless computer network to the wired computer network and/or provide information received from the wired computer network to the wireless computer network. In accordance with this example, the access point may enable (e.g., cause) information sent by the computing device via the wireless computer network to be provided to the wired computer network and/or may enable information received from the wired computer network to be forwarded to the computing device via the wireless computer network.

In an example approach of establishing multiple infrastructure connections between a computing device and multiple access points via a single WNIC, capability information, which indicates capabilities of the WNIC, is analyzed to determine one or more combinations of identified frequency bands over which the WNIC is capable of communicating simultaneously. Availability information, which indicates available frequency bands that are available to connect the computing device to one or more of the access points, is analyzed to determine signal qualities associated with the respective available frequency bands. For instance, a quality measurement associated with a frequency band prior to establishment of a connection over the frequency band may be referred to as a "signal quality," and a quality measurement associated with the frequency band after establishment of the connection over the frequency band may be referred to as a "link quality." For example, a signal quality and/or link quality associated with a frequency band may be based on (e.g., based at least in part on) a signal strength associated with the frequency band (e.g., signal strength associated with access point(s) that are visible on the frequency band), a signal-to-noise ratio (SNR) associated with the frequency band, an extent of interference encountered by the frequency band, a number of connections existing via the frequency band, a number of access points connected to the frequency band, a proportion of bandwidth that is usable by the frequency band that is utilized, an extent of latency associated with the frequency band, an extent of jitter associated with the frequency band, a throughput of the frequency band, and/or a load (e.g., congestion) of the frequency band. A primary infrastructure connection is established between the computing device and a first access point via the WNIC based at least in part on a first frequency band with which the first access point is associated being included among the identified frequency bands and being associated with a signal quality that is not less than a signal quality associated with each other available frequency band that is included in the identified frequency bands. For instance, a frequency band may be associated with a signal quality based on the access point(s) that are visible on the frequency band having the signal quality. A secondary infrastructure connection is established between the computing device and a second access point via the WNIC, such that the primary and secondary infrastructure connections are operable simultaneously, based at least in part on a second frequency band with which the second access point is associated being included among the identified frequency bands in a combination that includes the first frequency band.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the invention is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodi- FIG. 1 is a block diagram of an example single WNIC-based multi-connection system in accordance with an embodiment.

Figure 1:
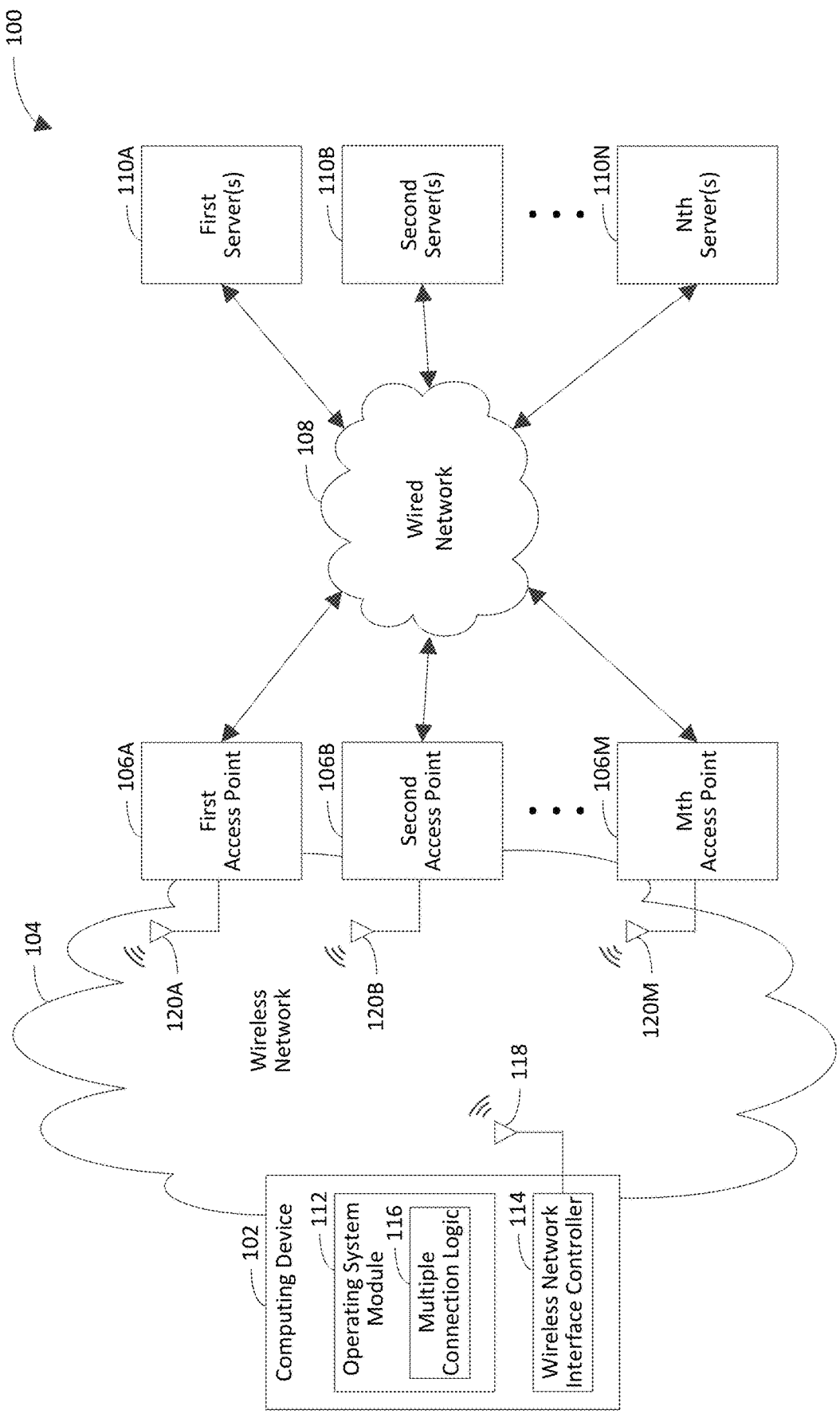

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the relevant art(s) to implement such feature, structure, or characteristic in connection with other embodiments whether or not explicitly described.

Descriptors such as "first", "second", "third", etc. are used to reference some elements discussed herein. Such descriptors are used to facilitate the discussion of the example embodiments and do not indicate a required order of the referenced elements, unless an affirmative statement is made herein that such an order is required.

II. Example Embodiments

Example embodiments described herein are capable of establishing multiple infrastructure connections to multiple access points via a single wireless network interface controller (WNIC). An infrastructure connection is a connection between a computing device and an access point. An access point is a networking hardware component that connects a wireless computer network to a wired computer network. For example, the access point may provide information received from the wireless computer network to the wired computer network and/or provide information received from the wired computer network to the wireless computer network. In accordance with this example, the access point may enable (e.g., cause) information sent by the computing device via the wireless computer network to be provided to the wired computer network and/or may enable information received from the wired computer network to be forwarded to the computing device via the wireless computer network.

Example techniques described herein have a variety of benefits as compared to conventional techniques for establishing infrastructure connections. For instance, the example techniques may be capable of establishing multiple infrastructure connections between a computing device and multiple access points via a single wireless network interface controller (WNIC). For instance, the infrastructure connections may be operable simultaneously via the WNIC. By using a single WNIC to establish the multiple infrastructure connections, the example embodiments may decrease space, complexity, power requirements, and/or cost (e.g., bill of materials cost) of the computing device. The example techniques may enable synchronized roaming to ensure that a primary interface on which the primary infrastructure connection is to be established continues to be connected to the connection having the highest link quality. For instance, a link quality of a connection may be based on a signal strength of the connection, a signal-to-noise ratio (SNR) of the connection, an extent of interference associated with the connection, a proportion of bandwidth that is usable by the connection that is utilized, an extent of latency associated with the connection, an extent of jitter associated with the connection, a throughput of the connection, and/or a load (e.g., congestion) of the connection.

The example techniques may overcome limitations associated with the Wi-Fi 7 standard. For example, such techniques may be capable of having multiple connections to different access points and/or different network names. In another example, the connections may be established using different authentication techniques and/or using different credentials. Applications may have control over which data path their data is sent. The applications may be able to indicate whether segments of the data traffic can be duplicated. The applications may be able to control segregation and duplication at a per-packet level. The example embodiments may enable the operating system of the computing device and/or other applications to enforce a policy (e.g., a per-path or per-application policy) over the different data paths.

The example techniques may reduce an amount of time and/or resources (e.g., processor, memory, network bandwidth) that are consumed to transfer information across a wireless network (e.g., from the computing device to access point(s) and/or from the access point(s) to the computing device). For example, by establishing multiple infrastructure connections to multiple access points via a single WNIC on the computing device, the throughput of information from the computing device to the access points and from the access points to the computing device may be increased. Increasing the throughput may reduce an amount of time that is consumed to transfer the information. By utilizing the single WNIC, the example techniques may utilize fewer WNICs than conventional techniques for establishing infrastructure connections.

By establishing multiple infrastructure connections to multiple access points via a single WNIC on the computing device, the example techniques may reduce latency and/or jitter associated with transferring information across a wireless network, increase efficiency of the computing device, improve (e.g., increase) a user experience of a user of the computing device, and/or increase efficiency of the user.

FIG. 1 is a block diagram of an example single WNIC-based multi-connection system 100 in accordance with an embodiment. Generally speaking, the single WNIC-based multi-connection system 100 operates to provide information to a user of a computing device 102 in response to requests (e.g., hypertext transfer protocol (HTTP) requests) that are received from the user. The information may include documents (Web pages, images, audio files, video files, etc.), output of executables, and/or any other suitable type of information. In accordance with example embodiments described herein, the single WNIC-based multi-connection system 100 establishes multiple infrastructure connections between the computing device 102 and multiple access points (e.g., two or more of access points 104A-104M) via a single WNIC 112. Detail regarding techniques for establishing multiple infrastructure connections between a computing device and multiple access points via a single WNIC is provided in the following discussion.

As shown in FIG. 1, the single WNIC-based multi-connection system 100 includes the computing device 102, a wireless network 104, a plurality of access points 106A-106M, a wired network 108, and a plurality of servers 110A-110N. Communication between the computing device 102 and the access points 106A-106M is carried out over the wireless network 104 using well-known network communication protocols. Communication between the access points 106A-106M and the servers 110A-110N is carried out over the wired network 108 using well-known network communication protocols. The wired network 108 may be a wide-area network (e.g., the Internet), a local area network (LAN), another type of network, or a combination thereof. It will be recognized that the wired network 108 need not necessarily be entirely wired. For instance, the wired network 108 may include one or more wireless networks, so long as at least a portion of the wired network is wired.

The computing device 102 is a processing systems that is capable of communicating with servers 110A-110N via one or more of the access points 106A-106M. An example of a processing system is a system that includes at least one processor that is capable of manipulating data in accordance with a set of instructions. For instance, a processing system may be a computer, a personal digital assistant, etc. The computing device 102 is configured to provide requests to one or more of the access points 106A-106M to be forwarded to the servers 110A-110N. The requests request information stored on (or otherwise accessible via) the servers 110A-110N. For instance, a user may initiate a request for executing a computer program (e.g., an application) using a client (e.g., a Web browser, Web crawler, or other type of client) deployed on the computing device 102, which is owned by or otherwise accessible to the user. In accordance with some example embodiments, the computing device 102 is capable of accessing domains (e.g., Web sites) hosted by the servers 110A-110N, so that the computing device 102 may access information that is available via the domains. Such domain may include Web pages, which may be provided as hypertext markup language (HTML) documents and objects (e.g., files) that are linked therein, for example.

The computing device 102 includes an operating system module 112 and a WNIC 114. The operating system module 112 executes an operating system, which performs operations that may include but are not limited to managing computer hardware and software resources and providing services for execution of applications on the computing device 102. Examples of an operating system include but are not limited to Android® and Chrome® operating systems, developed and distributed by Google LLC; Berkeley Software Distribution™ (BSD) operating system, developed and distributed by the Computer Systems Research Group (CSRG) of the University of California, Berkeley, or descendants thereof; Linux operating system developed and distributed under the GNU Project; iOS® and MacOS® operating systems developed and distributed by Apple Inc., Microsoft Windows® operating system developed and distributed by Microsoft Corporation; and UNIX™ operating system developed and distributed by AT&T.

The operating system module 112 is shown to include multiple connection logic 116. The multiple connection logic 116 is configured to establish multiple infrastructure connections between the computing device 102 and multiple access points (e.g., two or more of the access points 106A-106M) via the WNIC 114. The multiple connection logic 116 analyzes capability information, which indicates capabilities of the WNIC 114, to determine one or more combinations of identified frequency bands over which the WNIC 114 is capable of communicating simultaneously. The multiple connection logic 116 analyzes availability information, which indicates available frequency bands that are available to connect the computing device 102 to one or more of the access points 106A-106M, to determine signal qualities associated with the respective available frequency bands. For instance, a quality measurement associated with a frequency band prior to establishment of a connection over the frequency band may be referred to as a "signal quality," and a quality measurement associated with the frequency band after establishment of the connection over the frequency band may be referred to as a "link quality." For example, a signal quality and/or link quality associated with a frequency band may be based on (e.g., based at least in part on) a signal strength associated with the frequency band (e.g., signal strength associated with access point(s) that are identified on the frequency band), a signal-to-noise ratio (SNR) associated with the frequency band, an extent of interference encountered by the frequency band, a number of connections existing via the frequency band, a number of access points connected to the frequency band, a proportion of bandwidth that is usable by the frequency band that is utilized, an extent of latency associated with the frequency band, an extent of jitter associated with the frequency band, a throughput of the frequency band, and/or a load (e.g., congestion) of the frequency band. The multiple connection logic 116 establishes a primary infrastructure connection between the computing device 102 and the first access point 106A via the WNIC 114 based at least in part on a first frequency band with which the first access point 106A is associated being included among the identified frequency bands and being associated with a signal quality that is not less than a signal quality associated with each other available frequency band that is included in the identified frequency bands. For instance, a frequency band may be associated with a signal quality based on the access point(s) that are identified on the frequency band having the signal quality. The multiple connection logic 116 establishes a secondary infrastructure connection between the computing device 102 and the second access point 106B via the WNIC 114, such that the primary and secondary infrastructure connections are operable simultaneously, based at least in part on a second frequency band with which the second access point 106B is associated being included among the identified frequency bands in a combination that includes the first frequency band.

The multiple connection logic 116 may be implemented in various ways to establish multiple infrastructure connections to multiple access points via the WNIC 114, including being implemented in hardware, software, firmware, or any combination thereof. For example, the multiple connection logic 116 may be implemented as computer program code configured to be executed in one or more processors. In another example, at least a portion of the multiple connection logic 116 may be implemented as hardware logic/electrical circuitry. For instance, at least a portion of the multiple connection logic 116 may be implemented in a field-programmable gate array (FPGA), an application-specific integrated circuit (ASIC), an application-specific standard product (ASSP), a system-on-a-chip system (SoC), a complex programmable logic device (CPLD), etc. Each SoC may include an integrated circuit chip that includes one or more of a processor (a microcontroller, microprocessor, digital signal processor (DSP), etc.), memory, one or more communication interfaces, and/or further circuits and/or embedded firmware to perform its functions.

The multiple connection logic 116 may be partially or entirely incorporated in the operating system that is executed by the operating system module 112, though the example embodiments are not limited in this respect.

The WNIC 114 enables the computing device 102 to communicate over the wireless network 104 (e.g., wireless computer network). For instance, the WNIC 114 includes an antenna 118, which is configured to transmit wireless signals to any one or more of the access points 106A-106M. The WNIC 114 modulates the transmitted wireless signals to include information (e.g., HTTP requests) that is received from the operating system, which is executed by the operating system module 112. The antenna 118 is further configured to detect wireless signals, including information provided by one or more of the servers 110A-110N, that are received from any one or more of the access points 106A-106M.

An example implementation of the multiple connection logic 116 will now be described. Upon determining that the WNIC 114 supports multiple infrastructure connections, the multiple connection logic 116 may create two or more interfaces—a primary interface and one or more secondary interfaces. Each of these interfaces is a construct that is usable to establish an infrastructure connection. For instance, each of these interfaces may remain operational so long as the WNIC remains on, and infrastructure connections may be dynamically established and torn down over the interfaces while the interfaces remain operational. The primary interface may have the same functionality as in prior (e.g., legacy) implementations of the operating system, but the secondary interface(s) may be of a new interface type. The multiple connection logic 116 may create the secondary interface(s) as a result of the WNIC 114 indicating that the WNIC 114 supports multiple infrastructure connections. The multiple connection logic 116 may receive a notification from the WNIC 114 that indicates capabilities of the WNIC 114, including but not limited to a maximum number of secondary interfaces supported and combination(s) of bands on which the interfaces can be connected at the same time. In a first example, the WNIC 114 may be limited to one infrastructure connection on a 2.4 GHz band and another infrastructure connection on a 5 GHz band at the same time. In another example, the WNIC 114 may support two or more infrastructure connections simultaneously on the 5 GHz band, on a 6 GHz band, or on both of the 5 GHz and 6 GHz bands.

Once the interfaces are created, the interfaces may be left in a ready state until one or more (e.g., all) of the following connection criteria are met:

1. No policy and/or user or device configuration prohibits connectivity on the primary interface and/or the secondary interface.
2. For the primary interface, a connection is set up based on pre-configured auto-connect profiles or based on a user or application sending an explicit request to connect or disconnect using the user interface or application programming interface(s) (APIs) or scripts or based on a configuration or policy mechanism. The network to which the connection is to be established has been seen in scan results that identify available connections or is configured as a "hidden" network for the connection to proceed.
3. The multiple connection logic 116 may perform one or more of the following additional checks before connecting on the secondary interface:
    a. Ensure the computing device 102 is not already connected on the maximum number of interfaces and bands that are allowed, as indicated by the supported band combinations defined in the capabilities of the WNIC 114.
    b. Check that there is no temporary or situational limitation that may prevent connectivity. For example, the computing device 102 may have an existing peer-to-peer connection that the computing device 102 is using for wireless display, which may prevent connectivity. In another example, the computing device 102 may support a Wi-Fi 7 standard, and the computing device 102 may be already connected on all the additional bands possible using the multiple connection functionality.
    c. Confirm presence of an application that is multi-connection-aware (and potentially multi-path-aware), and the application has indicated that it is available to connect over the secondary interface. An application that is multi-path-aware is an application that is capable of supporting multiple paths to a server simultaneously. Each path is defined by a respective frequency band. An application that is multi-connection-aware is an application that is capable of supporting multiple connections from a common (i.e., same) computing device simultaneously. Any two or more of the connections may be on a same path or on different paths. The presence of such an application may be confirmed by opening a handle (e.g., on a wlansvc service) and setting an opcode value to true to notify the multiple connection logic 116 that the application is available. The multiple connection logic 116 may keep track of all applications that did this and enable connections on the secondary interface so long as at least one such application has kept its handle open after setting the opcode value. If the application sets the opcode value to false or closes the handle or is terminated abnormally, then the application is no longer deemed to be requesting multi-channel connectivity. When all such applications have gone away, the multiple connection logic 116 may stop connecting over the secondary interface(s) at its discretion. This behavior can be used to limit power consumption and improve system stability if no application is available to use the multi-connection feature.

The multiple connection logic 116 may be configured to support an asynchronous (e.g., independent) connection mode and a synchronized (e.g., dependent) connection mode. In the asynchronous connection mode, connections over the primary and secondary interfaces are set up and torn down (i.e., disconnected) independently of each other. The network(s) to which a connection is to be made may be determined by the user or via a policy. A user may configure a priority or network-combination scheme to set up multiple connections. For example, the user may indicate, in priority order, to which network a connection is to be made and on which band. The user may also specify which combination of networks to which connections are to be made based on visibility of the networks. These schemes can be configured via a user interface, API call(s), or a scripting interface. Roaming on each of the interfaces may be limited to the network and band configured for that interface and may depend on the visibility and connectivity of the available access points. If the connection on either of the interfaces cannot be maintained or becomes disconnected, a new set of network candidates may be generated, and the multiple connection logic 116 may attempt to connect to those network candidates on the available interface(s).

In the synchronized connection mode, connections over the primary and secondary interfaces are set up and torn down in conjunction. Connections on the primary interface are attempted first and are free to connect to any access point on any band based on the list of candidate access points generated for the configured network. The connections on the secondary interface(s) follow the connections on the primary interface and may be attempted based on (e.g., only if) one or more (e.g., all) of the criteria mentioned above are met. The network to which a connection is to be made on the secondary interface may be limited to the same network as the primary interface, but the network may be limited to connecting on those available bands and/or access points so as to not disrupt the primary interface connection.

Once the primary interface is connected, the multiple connection logic 116 may keep the primary interface connected to the best available access point (e.g., the access point associated with the channel and frequency band that is expected to provide the highest link quality) at all times. The secondary interface connection(s) may be deemed to be "best-effort," and may be kept connected so long as the primary interface connection is operable. The primary interface connection may be able to connect to any access point that satisfies the network criteria on any band and channel. If the conditions of the wireless network 104 change such that the connection on any of the secondary interface(s) has a better (e.g., higher) link quality than the link quality of the primary interface, the multiple connection logic 116 may roam the primary interface connection to the band and/or access point of the secondary interface, and the WNIC 114 may be forced to roam the secondary interface connection to another access point on the same or different band as supported by the WNIC 114 if the WNIC 114 were unable to sustain the connection. If the number of sustainable connections is less than the number of connections supported by the WNIC 114, then the secondary interface connection(s) may get torn down first, and the primary interface may be the last to be disconnected when there is no available candidate left to which to connect for that network configuration. This is so that legacy and/or non-multipath-aware applications which bind to a single interface can remain connected over the primary interface and can continue to receive the best (e.g., strongest) connectivity on that interface, while multi-path aware applications may know which interface is the best quality interface and which one is second-best.

Note that if the user or policy configuration allows connections to be made to different networks on the primary and secondary interface(s), the network characteristics may not be limited. For example, the networks may use different authentication methods or credentials. The networks may be of different types, such as public versus private or enterprise versus non-enterprise, and therefore may have different firewall rules configured thereon. The networks may have different settings, such as different static IP addresses, DNS servers, routing policies, and so on.

The primary and secondary interface(s) can be configured in different ways. For instance, in a default configuration, the primary interface may be the default interface for routing data traffic, and any applications that need to send data over the secondary interface may be required to bind explicitly to the secondary interface. Thus, multi-path and multi-connection-aware applications can choose one or more of the following techniques to take advantage of multiple interface connections:

1. A latency-sensitive application can duplicate traffic across at least two of the connections so that at least one of the packets reaches its destination on the fastest available path at that time.
2. A throughput-intensive application can fill the connections to the maximum limit so that the effective throughput becomes the sum of the connections.
3. A loss-sensitive application can choose to use the best connection for its most reliable data path and send repair or parity data on another path to decrease a probability of data loss.
4. An application with varying classes of traffic data can choose to segregate its data such that the data with the highest quality requirements is sent on a connection having relatively greater quality, and the data with lower quality (e.g., "best-effort" requirements) is sent on a connection having relatively lesser quality.
5. A management component in the multiple connection logic 116 (or a separate application) can segregate connections and even data over the different interfaces depending on packet-specific quality of service (QoS) requirements and/or based on application-specific system policy.
6. Newer protocols, such as the QUIC transport layer network protocol developed by the Internet Engineering Task Force (IETF), can use the multiple data paths as part of those protocols so that applications can get the benefit of multiple infrastructure connections without having to be multi-connection-aware.

Another option is to let the routing be dynamic so that some data traffic is sent over the primary interface and other data traffic is sent on the secondary interface(s). The determination of the interface can be made dynamically based on varying criteria, such as balancing traffic loads on the respective interfaces, availability of different shortest paths across the interfaces, and so on. Yet another option is for an application or policy to configure connections from designated applications or users to use a designated interface based on specified criteria.

The computing device 102 may include any client-enabled system or device, including but not limited to a desktop computer, a laptop computer, a tablet computer, a wearable computer such as a smart watch or a head-mounted computer, a personal digital assistant, a cellular telephone, an Internet of things (IoT) device, or the like. It will be recognized that the computing device 102 may communicate with any one or more of the servers 110A-110N via any one or more of the access points 106A-106M.

Each of the access points 106A-106M serves as an interface between the wireless network 104 and the wired network 108. The access points 106A-106M include respective antennas 120A-120M, which are configured to transmit wireless signals to the WNIC 114. Each of the access points 106A-106M modulates the wireless signals that are transmitted by the respective access point to include information received via the wired network 108 from one or more of the servers 110A-110N. Each of the antennas 120A-120M is further configured to detect wireless signals that are received from the WNIC 114. The received wireless signals include information provided by the operating system, which is executed by the operating system module 112. Each of the access points 106A-106M forwards, via the wired network 108, the information that is included in the wireless signals received by that access point to whichever of the servers 110A-110N are identified in the information.

The servers 110A-110N are processing systems that are capable of communicating with the computing device 102 via one or more of the access points 106A-106M. The servers 106A-106N are configured to execute computer programs that provide information to the user of the computing device 102 in response to receiving requests from the user. For example, the information may include documents (Web pages, images, audio files, video files, etc.), output of executables, or any other suitable type of information. Any one or more of the computer programs may be a cloud computing service. A cloud computing service is a service that executes at least in part in the cloud. The cloud may be a remote cloud, an on-premises cloud, or a hybrid cloud. It will be recognized that an on-premises cloud may use remote cloud services. Examples of a cloud computing service include but are not limited to Azure® developed and distributed by Microsoft Corporation, Google Cloud® developed and distributed by Google Inc., Oracle Cloud® developed and distributed by Oracle Corporation, Amazon Web Services® developed and distributed by Amazon.com, Inc., Salesforce® developed and distributed by Salesforce.com, Inc., and Rackspace® developed and distributed by Rackspace US, Inc. In accordance with some example embodiments, the servers 106A-106N are configured to host respective Web sites, so that the Web sites are accessible to the user of the computing device 102.

FIGS. 2-7 depict flowcharts 200, 300, 400, 500, 600, and 700 of example methods for establishing multiple infrastructure connections between a computing device and multiple access points (e.g., routers) via a single WNIC in accordance with embodiments. Flowcharts 200, 300, 400, 500, 600, and 700 may be performed by the computing device 102 shown in FIG. 1, for example. For illustrative purposes, flowcharts 200, 300, 400, 500, 600, and 700 are described with respect to a computing device 800 shown in FIG. 8, which is an example implementation of the computing device 102. As shown in FIG. 8, the computing device 800 includes multiple connection logic 816. The multiple connection logic 816 includes availability analysis logic 822, capability analysis logic 824, comparison logic 826, connection establishment logic 828, signal quality analysis logic 830, connection monitoring logic 832, and information transfer logic 834. Further structural and operational embodiments will be apparent to persons skilled in the relevant art(s) based on the discussion regarding flowcharts 200, 300, 400, 500, 600, and 700.

Figure 2:
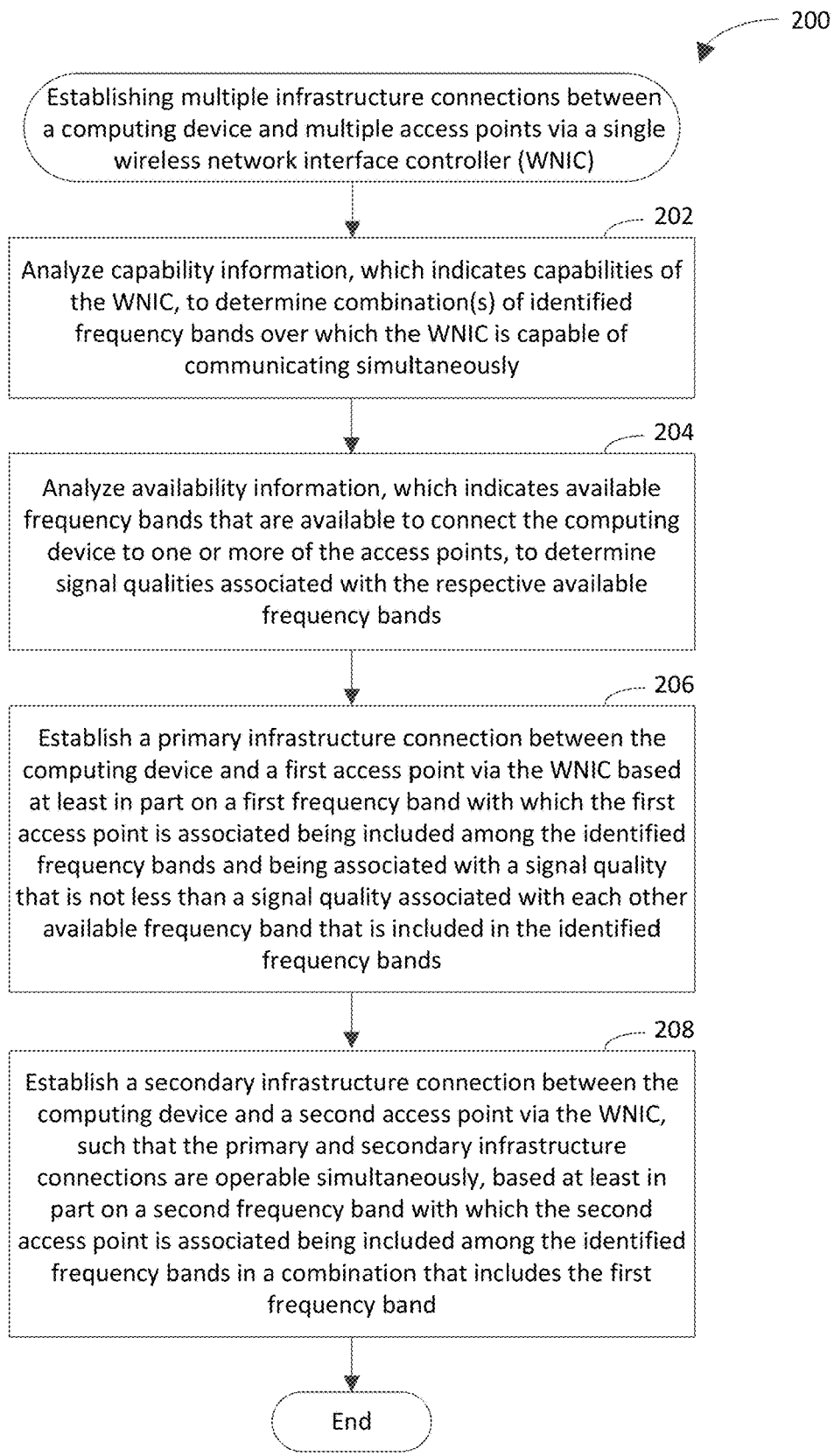
FIGS. 2-7 depict flowcharts of example methods for establishing multiple infrastructure connections between a computing device and multiple access points via a single WNIC in accordance with embodiments.

As shown in FIG. 2, the method of flowchart 200 begins at step 202. In step 202, capability information, which indicates capabilities of the WNIC, is analyzed to determine combination(s) of identified frequency bands over which the WNIC is capable of communicating simultaneously. In an example implementation, the capability analysis logic 824 analyzes capability information 838, which indicates the capabilities of the WNIC (e.g., WNIC 114), to determine the combination(s) of the identified frequency bands over which the WNIC is capable of communicating simultaneously. For instance, the capability analysis logic 824 may receive the capability information 838 from the WNIC (e.g., as a result of the WNIC being powered on). In accordance with this implementation, the capability analysis logic 824 may generate combination information 856 to indicate (e.g., specify) the combination(s) of the identified frequency bands over which the WNIC is capable of communicating simultaneously.

At step 204, availability information, which indicates available frequency bands that are available to connect the computing device to one or more of the access points, is analyzed to determine signal qualities associated with the respective available frequency bands. For instance, a frequency band may be associated with a signal quality based on access point(s) that are associated with the frequency band having the signal quality. For example, a signal quality associated with a frequency band may be based on (e.g., based at least in part on) a signal strength associated with the frequency band (e.g., signal strength associated with the access point(s) that are associated with the frequency band), a signal-to-noise ratio (SNR) associated with the frequency band, an extent of interference encountered by the frequency band, a number of connections existing via the frequency band, a number of access points connected to the frequency band, a proportion of bandwidth that is usable by the frequency band that is utilized, an extent of latency associated with the frequency band, an extent of jitter associated with the frequency band, a throughput of the frequency band, and/or a load (e.g., congestion) of the frequency band. The signal strength associated with the frequency band may indicate an amplitude of any one or more wireless signals having a frequency (e.g., carrier frequency) that is included in the frequency band. The SNR associated with the frequency band may indicate power of a signal to power of background noise for any one or more of the frequencies in the frequency band. The extent of interference encountered by the frequency band may be an extent to which power from other frequency bands interferes with (e.g., changes or disrupts) signals having frequencies in the frequency band. The extent of latency associated with the frequency band indicates an amount of delay encountered by signals having frequencies in the frequency band to travel from a source (e.g., WNIC 114) to a destination (e.g., any of access points 106A-106M). The extent of jitter associated with the frequency band indicates an extent to which periodic signals having frequencies in the frequency band deviate from true periodicity. The throughput of the frequency band indicates a rate at which information is transferred via the frequency band. The load of the frequency band may indicate a number of connections that simultaneously exist on the frequency band, a number of access points to which the frequency band is simultaneously connected, and/or an amount of information that is transferred via the frequency band over a period of time.

Each of the identified frequency bands and each of the available frequency bands may correspond to any suitable frequency or range of frequencies. For instance, an identified frequency band or an available frequency band may be a 2.4 gigahertz (GHz) frequency band, a 2.5 GHz frequency band, a 2.6 GHz frequency band, a 5 GHz frequency band, or a 6 GHz frequency band. A frequency band that is identified by a designated frequency includes the designated frequency. For example, a 2.4 GHz frequency band includes 2.4 GHz. In accordance with this example, the 2.4 GHz frequency band may extend from a starting frequency of 2.4 GHz to an ending frequency that is greater than 2.4 GHz. For instance, the ending frequency may be 2.49 GHz or 2.499 GHz.

In an example implementation, the availability analysis logic 822 analyzes availability information 836, which indicates the available frequency bands that are available to connect the computing device 800 to one or more of the access points, to determine signal qualities associated with the respective available frequency bands. In accordance with this implementation, the availability analysis logic 822 may generate available band information 854 to indicate the signal qualities associated with the respective available frequency bands.

At step 206, a primary infrastructure connection is established between the computing device and a first access point via the WNIC based at least in part on a first frequency band with which the first access point is associated being included among the identified frequency bands and being associated with a signal quality that is not less than a signal quality associated with each other available frequency band that is included in the identified frequency bands. The primary infrastructure connection may be maintained as the best connection (i.e., connection having highest link quality) to the available access points at all times, though the example embodiments are not limited in this respect. In an example implementation, the connection establishment logic 828 establishes the primary infrastructure connection between the computing device 800 and the first access point via the WNIC.

For example, the comparison logic 826 may compare the identified frequency bands in each combination, as indicated by the combination information 856, and the available frequency bands, as indicated by the available band information 854, to determine which of the identified frequency bands in each combination are included among the available frequency bands. For each combination that includes at least one identified frequency band that is included among the available frequency bands, the comparison logic 826 may generate a prospective combination that includes each identified frequency band from the combination that is included among the available frequency bands. The comparison logic 826 may generate prospective combination information 848 to indicate each prospective combination and each identified frequency band that is included in the respective prospective combination.

In accordance with this example, the signal quality analysis logic 830 may determine signal quality parameter(s) associated with each available frequency band based on the available band information 854. Examples of a signal quality parameter associated with an available frequency band include but are not limited to signal strength, signal-to-noise ratio (SNR), interference, number of connections, number of connected access points, available bandwidth, latency, jitter, throughput, and load (e.g., congestion) of the available frequency band.

In further accordance with this example, the connection establishment logic 828 may establish a primary infrastructure connection 858 between the computing device 800 and the first access point via the WNIC based at least in part on the first frequency band with which the first access point is associated being included among the identified frequency bands in the prospective combination(s), as indicated by the prospective combination information 848, and being associated with a signal quality that is not less than a signal quality associated with each other identified frequency band included among the prospective combinations, as indicated by the signal quality information 850. For instance, the connection establishment logic 828 may cross-reference the identified frequency bands indicated by the prospective combination information 848 with the available frequency bands indicated by the signal quality information 850 to determine a subset of the available frequency bands that is to be taken into consideration for determining the first frequency band that is to be used for the primary infrastructure connection 858. The connection establishment logic 828 may then designate the identified frequency band from the subset that is associated with a signal quality that is not less than the signal quality associated with each other identified frequency band in the subset to be the first frequency band. The connection establishment logic 828 may then establish the primary infrastructure connection 858 using the first frequency band.

At step 208, a secondary infrastructure connection is established between the computing device and a second access point via the WNIC, such that the primary and secondary infrastructure connections are operable (e.g., usable) simultaneously, based at least in part on a second frequency band with which the second access point is associated being included among the identified frequency bands in a combination that includes the first frequency band. It will be recognized that the multiple access points include the first access point and the second access point. It will be further recognized that the multiple infrastructure connections include the primary infrastructure connection and the secondary infrastructure connection. The secondary infrastructure connection is different from the primary infrastructure connection. The secondary infrastructure connection may be established based on "best effort," though the example embodiments are not limited in this respect. For instance, the secondary infrastructure connection may be established without any guarantee that information transmitted via the secondary infrastructure connection is delivered or that delivery meets any quality of service. The first and second access points may be same or different. The first and second frequency bands may be same or different.

In an example implementation, the connection establishment logic 828 establishes the secondary infrastructure connection, which is included among secondary infrastructure connection(s) 860, between the computing device 800 and the second access point via the WNIC. For example, the connection establishment logic 828 may select the second frequency band from the identified frequency bands in the prospective combination that includes the first frequency band. In accordance with this example, the connection establishment logic 828 may review the prospective combination information 848 to identify which identified frequency bands are included in the prospective combination that includes the first frequency band and select the second frequency band from those identified frequency bands. The connection establishment logic 828 may then establish the secondary infrastructure connection using the second frequency band.

In an example embodiment, the first and second access points are associated with a same wireless communication network.

In another example embodiment, the first access point is associated with a first wireless communication network, and the second access point is associated with a second wireless communication network that is different from the first wireless communication network. For instance, the first wireless communication network may be associated with (e.g., uniquely identified by) a first service set identifier (SSID), and the second wireless communication network may be associated with a second SSID that is different from the first SSID.

In yet another example embodiment, establishing the primary infrastructure connection at step 206 is performed using credentials of a user of the computing device. Examples of a credential include but are not limited to a username, a password, a personal identification number (PIN), information from a hardware token or a FIDO token, an authenticator push notification from the computing device, and a transaction authentication number (TAN). In accordance with this embodiment, establishing the secondary infrastructure connection at step 208 is performed using the credentials of the user.

In still another example embodiment, establishing the primary infrastructure connection at step 206 is performed using first credentials. In accordance with this embodiment, establishing the secondary infrastructure connection at step 208 is performed using second credentials that are different from the first credentials.

In another example embodiment, the first access point is associated with a first wireless communication network of a specified network type, and the second access point is associated with a second wireless communication network of the specified network type. In accordance with this embodiment, the second wireless communication network is different from the first wireless communication network. In further accordance with this embodiment, the specified network type is a public network type, a private network type, an enterprise network type, or a non-enterprise network type. A wireless communication network of the public network type is a wireless communication network that is accessible to the general public. A wireless communication network of the private network type is a wireless communication network that is not accessible to the general public; for instance, access to the wireless communication network may be limited to only specified people or specified groups of people. A wireless communication network of the enterprise network type is a wireless communication network that is included within an enterprise. A wireless communication network of the non-enterprise network type is a wireless communication network that is not included within an enterprise.

In yet another example embodiment, the first access point is associated with a first wireless communication network of a first network type. In accordance with this embodiment, the second access point is associated with a second wireless communication network of a second network type that is different from the first network type. In a first aspect of this embodiment, the first network type may be a public network type, and the second network type may be a private network type. In a second aspect of this embodiment, the first network type may be a private network type, and the second network type may be a public network type. In a third aspect of this embodiment, the first network type may be an enterprise network type, and the second network type may be a non-enterprise network type. In a fourth aspect of this embodiment, the first network type may be a non-enterprise network type, and the second network type may be an enterprise network type.

In some example embodiments, one or more steps 202, 204, 206, and/or 208 of flowchart 200 may not be performed. Moreover, steps in addition to or in lieu of steps 202, 204, 206, and/or 208 may be performed. For instance, in an example embodiment, the method of flowchart 200 further includes establishing an other secondary infrastructure connection between the computing device and a third access point via the WNIC, such that the primary, secondary, and other secondary infrastructure connections are operable simultaneously, based at least in part on a third frequency band with which the third access point is associated being included among the identified frequency bands in the combination that includes the first frequency band and the second frequency band. It will be recognized that the multiple access points include the third access point. It will be further recognized that the multiple infrastructure connections include the other secondary infrastructure connection. The other secondary infrastructure connection is different from the primary infrastructure connection and the secondary infrastructure connection. The other secondary infrastructure connection may be established based on "best effort," though the example embodiments are not limited in this respect. The first and third access points may be same or different. The second and third access points may be same or different. The first and third frequency bands may be same or different. The second and third frequency bands may be same or different.

In an aspect of this embodiment, the capability information indicates, for the combination that includes the first frequency band and the second frequency band, a number of instances of each identified frequency band in the combination over which the WNIC is capable of communicating simultaneously. In accordance with this aspect, the second and third frequency bands are same. In further accordance with this aspect, establishing the other second infrastructure connection is based at least in part on the capability information indicating that the WNIC is capable of communicating over at least two instances of the second frequency band in the combination simultaneously.

In an example implementation, the connection establishment logic 828 establishes the other secondary infrastructure connection, which is included among the secondary infrastructure connection(s) 860, between the computing device 800 and the third access point via the WNIC, such that the primary infrastructure connection 858, the secondary infrastructure connection 860, and the other secondary infrastructure connection are operable simultaneously. For example, the connection establishment logic 828 may select the third frequency band from the identified frequency bands in the prospective combination that includes the first and second frequency bands. In accordance with this example, the connection establishment logic 828 may review the prospective combination information 848 to identify which identified frequency bands are included in the prospective combination that includes the first and second frequency bands and select the third frequency band from those identified frequency bands. The connection establishment logic 828 may then establish the other secondary infrastructure connection using the third frequency band.

In another example embodiment, the method of flowchart 200 further includes synchronizing transfer of information via the primary infrastructure connection and transfer of the information via the secondary infrastructure connection. In an example implementation, the information transfer logic 834 synchronizes the transfer of information 864 via the primary infrastructure connection 858 and the transfer of the information 864 via the secondary infrastructure connection 860. For instance, the information transfer logic 834 may perform the synchronization in accordance with transfer rules 846 that are received by the information transfer logic 834. The transfer rules 846 may be established by a user of the computing device 800, an application that executes on the computing device 800, an administrator of an enterprise that includes the computing device 800, or a manufacturer of hardware that is included in the computing device 800.

In yet another example embodiment, the capability information indicates whether the WNIC supports a low power state in which the secondary infrastructure connection remains in a low power state until the WNIC receives data to be transmitted via the secondary infrastructure connection or until the WNIC receives data corresponding to (e.g., matching or being same as) predefined data that is defined prior to the secondary infrastructure connection entering the low power state. For instance, the predefined data may include one or more patterns (a.k.a. wake-up patterns) that are configured to wake the secondary infrastructure connection from the low power state. In an example implementation, the capability information 838 indicates whether the WNIC supports the low power state. In accordance with this embodiment, the method of flowchart 200 further includes maintaining the secondary infrastructure connection in the low power state based at least in part on the capability information indicating that the WNIC supports the low power state. In an example implementation, the connection establishment logic 828 maintains the secondary infrastructure connection in the low power state based at least in part on the capability information 838 indicating that the WNIC supports the low power state. For instance, the connection establishment logic 828 may maintain the secondary infrastructure connection in the low power state until data 840 is received. For example, the data 840 may be configured for transmission via the secondary infrastructure connection. In accordance with this example, the data 840 may include an identifier that identifies the secondary infrastructure connection. For instance, the identifier may identify the secondary infrastructure connection by identifying the second access point and/or the second frequency band, both of which are associated with the secondary infrastructure connection). In another example, the data 840 may correspond to the predefined data.

Figure 3:
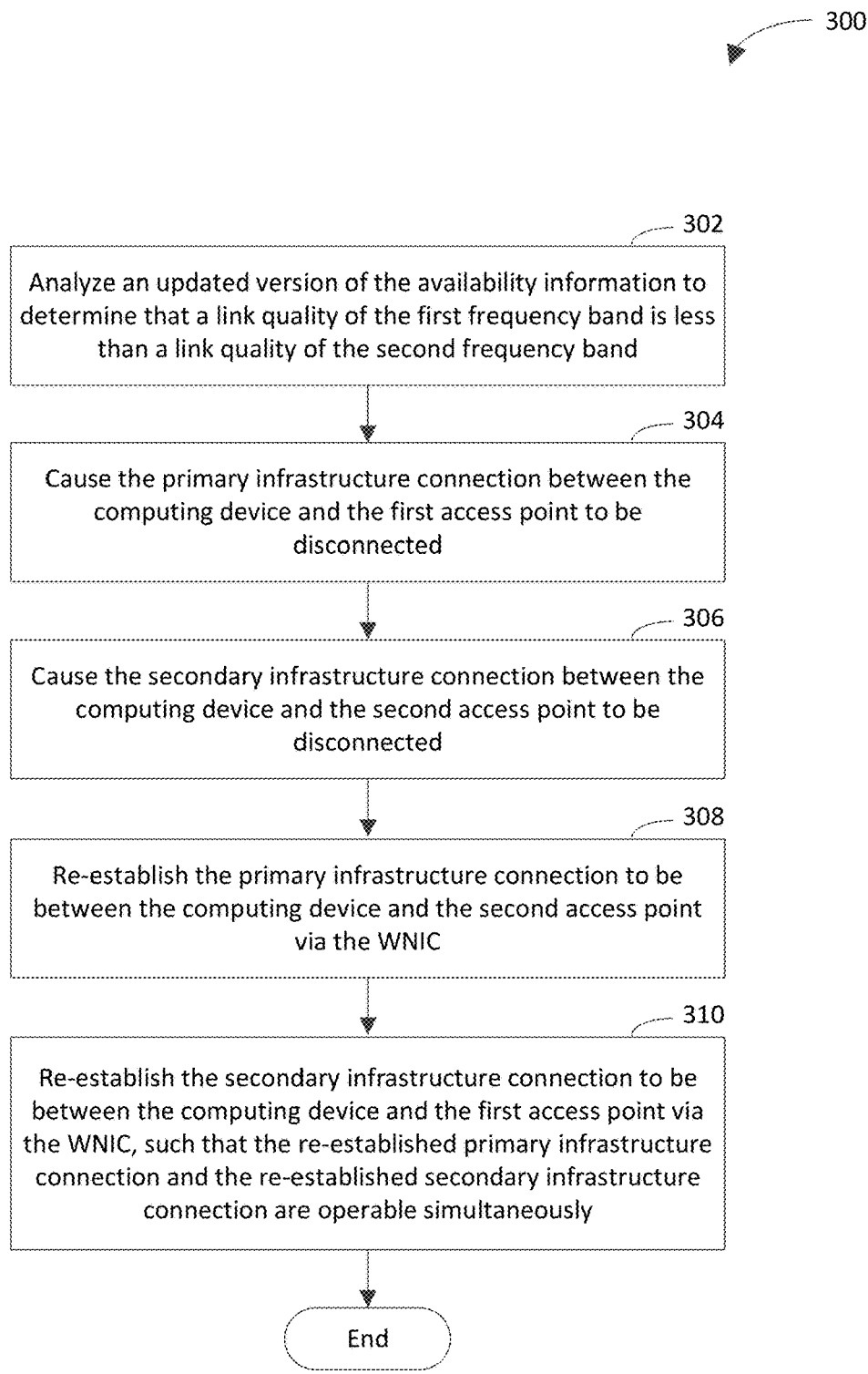

In still another example embodiment, the method of flowchart 200 further includes one or more of the steps shown in flowchart 300 of FIG. 3. As shown in FIG. 3, the method of flowchart 300 begins at step 302. In step 302, an updated version of the availability information is analyzed to determine that a link quality of the first frequency band is less than a link quality of the second frequency band. In an example implementation, the availability analysis logic 822 and the comparison logic 826 collaboratively analyze the updated version of the availability information 836 to determine that the link quality of the first frequency band is less than the link quality of the second frequency band. For instance, the availability analysis logic 822 may analyze the updated version of the availability information 836 to determine updated link qualities associated with the respective available frequency bands. The availability analysis logic 822 may generate an updated version of the available band information 854 to indicate the updated link qualities. The comparison logic 826 may compare the updated link qualities that are indicated by the updated version of the available band information 854 to determine that an updated link quality of the first frequency band is less than an updated link quality of the second frequency band. The comparison logic 826 may generate the prospective combination information 848 to indicate that the updated link quality of the first frequency band is less than the updated link quality of the second frequency band.

In an example embodiment, a roaming operation is performed to obtain the updated version of the availability information. The roaming operation may include providing a ping signal to any one or more (e.g., all) of the access points and receiving, in response to the ping signals, the updated version of the availability information. For instance, the updated version of the availability information may include a response from each of the access points, indicating the available frequency bands that are associated with the respective access point and further indicating the link qualities associated with those available frequency bands. By analyzing the responses to the ping signals, the link qualities of the respective first and second frequency bands may be determined and then compared.

In another example embodiment, a notification is received from a driver of the WNIC, indicating that the driver is unable to maintain sufficient link quality (e.g., a predefined link quality) on the primary infrastructure connection. The notification is included in the updated version of the availability information. In accordance with this embodiment, a determination is made that the link quality of the first frequency band on which the primary infrastructure connection was established is less than the link quality of the second frequency band based at least in part on the notification received from the driver.

In yet another example embodiment, a notification is received from the driver of the WNIC, specifying that the link quality of the first frequency band is less than the link quality of the second frequency band. In accordance with this embodiment, a determination is made that the link quality of the first frequency band is less than the link quality of the second frequency band based at least in part on the notification received from the driver.

At step 304, the primary infrastructure connection between the computing device and the first access point is caused to be disconnected. In an example implementation, the connection establishment logic 828 causes the primary infrastructure connection 858 between the computing device 800 and the first access point to be disconnected. For instance, the connection establishment logic 828 may cause the primary infrastructure connection 858 to be disconnected based on (e.g., based at least in part on or as a result of) the link quality of the first frequency band being less than the link quality of the second frequency band. It will be recognized that the primary infrastructure connection may be caused to be disconnected based on any of a variety of factors in addition to or in lieu of the link quality of the first frequency band being less than the link quality of the second frequency band. For example, a request may be received from the first access point, requesting that an access point that is different from the first access point be selected for establishment of the primary infrastructure connection. In accordance with this example, the request may be received as a result of the first access point being overloaded (e.g., a load of the first access point being greater than or equal to a load threshold). The load of the first access point being greater than or equal to the load threshold may be based on a number of clients (e.g., computing devices) that are connected to the first access point or a number of connections that are connected to the first access point being greater than or equal to the load threshold.

In an example embodiment, causing the primary infrastructure connection to be disconnected at step 304 includes disconnecting the primary infrastructure connection between the computing device and the first access point.

In another example embodiment, causing the primary infrastructure connection to be disconnected at step 304 includes causing a driver of the WNIC or firmware of the WNIC to disconnect the primary infrastructure connection between the computing device and the first access point. For instance, an instruction may be sent to the driver or firmware, triggering the driver or firmware to disconnect the primary infrastructure connection.

At step 306, the secondary infrastructure connection between the computing device and the second access point is caused to be disconnected. In an example implementation, the connection establishment logic 828 causes the secondary infrastructure connection between the computing device 800 and the second access point to be disconnected. For instance, the connection establishment logic 828 may cause the secondary infrastructure connection to be disconnected based on the link quality of the first frequency band being less than the link quality of the second frequency band.

In an example embodiment, causing the secondary infrastructure connection to be disconnected at step 306 includes disconnecting the secondary infrastructure connection between the computing device and the second access point.

In another example embodiment, causing the secondary infrastructure connection to be disconnected at step 306 includes causing a driver of the WNIC or firmware of the WNIC to disconnect the secondary infrastructure connection between the computing device and the second access point. For instance, an instruction may be sent to the driver or firmware, triggering the driver or firmware to disconnect the secondary infrastructure connection.

At step 308, the primary infrastructure connection is re-established to be between the computing device and the second access point via the WNIC. In an example implementation, the connection establishment logic 828 re-establishes the primary infrastructure connection 858 to be between the computing device 800 and the second access point via the WNIC. For instance, the connection establishment logic 828 may re-establish the primary infrastructure connection 858 to be between the computing device 800 and the second access point based on the link quality of the first frequency band being less than the link quality of the second frequency band.

At step 310, the secondary infrastructure connection is re-established to be between the computing device and the first access point via the WNIC, such that the re-established primary infrastructure connection and the re-established secondary infrastructure connection are operable simultaneously. In an example implementation, the connection establishment logic 828 re-establishes the secondary infrastructure connection to be between the computing device 800 and the first access point via the WNIC, such that the re-established primary infrastructure connection 858 and the re-established secondary infrastructure connection are operable simultaneously. In accordance with this implementation, the re-established secondary infrastructure connection is included among the secondary infrastructure connection(s) 860. In an example, the connection establishment logic 828 may re-establish the secondary infrastructure connection to be between the computing device 800 and the first access point based on the link quality of the first frequency band being less than the link quality of the second frequency band.

Figure 4:
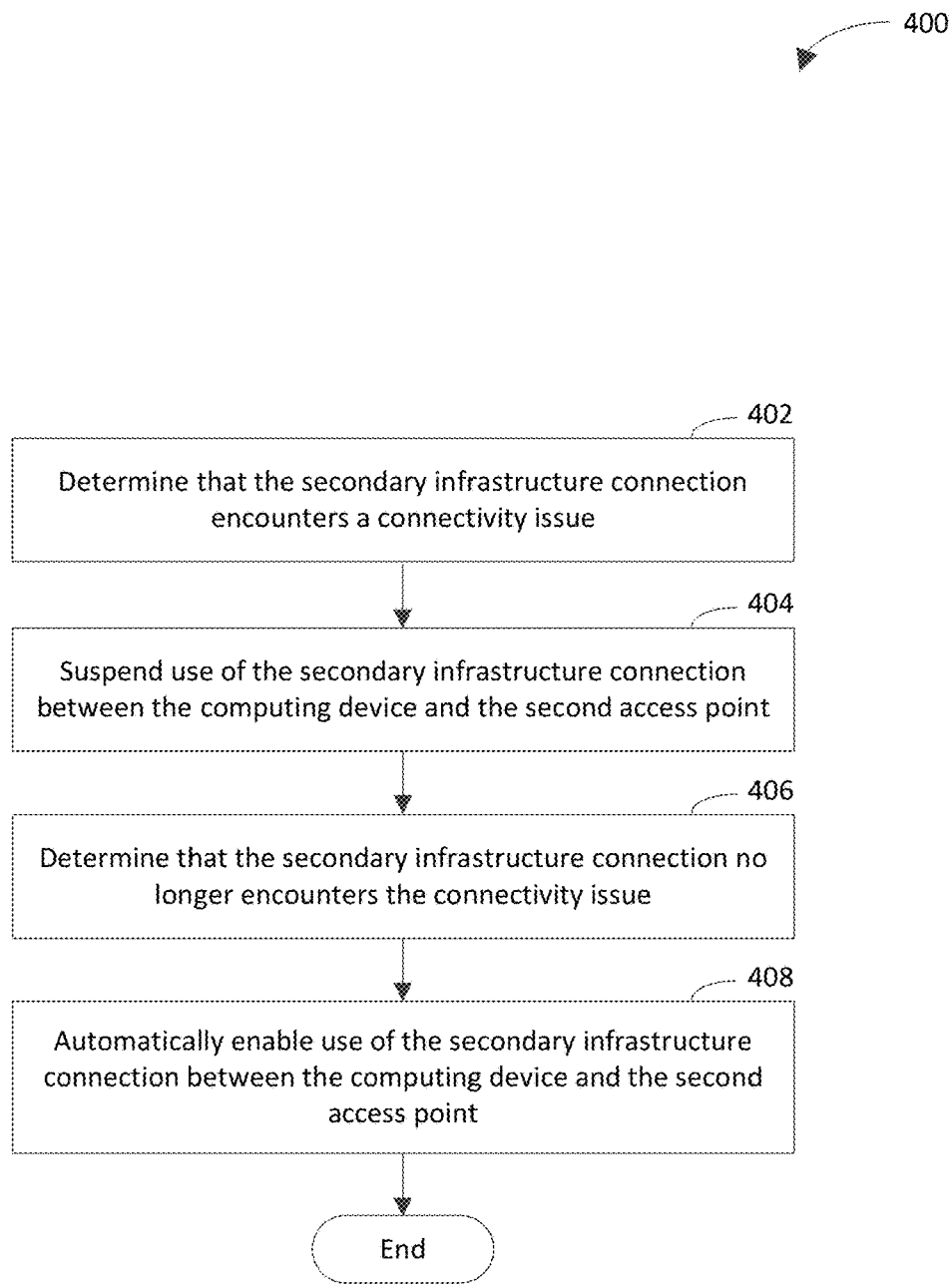

In another example embodiment, the method of flowchart 200 further includes one or more of the steps shown in flowchart 400 of FIG. 4. As shown in FIG. 4, the method of flowchart 400 begins at step 402. In step 402, a determination is made that the secondary infrastructure connection encounters a connectivity issue. In an example implementation, the connection monitoring logic 832 determines that the secondary infrastructure connection has encountered a connectivity issue. For example, the connection monitoring logic 832 may monitor issue information 844, which indicates whether the secondary infrastructure connection has encountered a connectivity issue. In accordance with this example, the issue information 844 may be updated in real-time (e.g., continuously) or periodically (e.g., at each of a plurality of time increments, such as once per second or once per minute) based on a current status of the secondary infrastructure connection. In further accordance with this implementation, the connection monitoring logic 832 may generate a suspension instruction 852 to instruct the information transfer logic 834 to suspend use of the secondary infrastructure connection based on the issue information 844 indicating that the secondary infrastructure connection has encountered a connectivity issue.

At step 404, use of the secondary infrastructure connection between the computing device and the second access point is suspended. For example, the use of the secondary infrastructure connection may be suspended based on the determination that the secondary infrastructure connection encounters the connectivity issue. The connectivity issue may be based on any of a variety of factors, including but not limited to a reduced ability to identify the second access point and a temporary malfunction of a driver (e.g., of the WNIC). In an example implementation, the information transfer logic 834 suspends the use of the secondary infrastructure connection between the computing device 800 and the second access point. For example, the information transfer logic 834 may suspend the use of the secondary infrastructure connection based on the suspend instruction 852 instructing the information transfer logic 834 to suspend the use of the secondary infrastructure connection.

At step 406, a determination is made that the secondary infrastructure connection no longer encounters the connectivity issue. In an example implementation, the connection monitoring logic 832 determines that the secondary infrastructure connection is no longer encountering the connectivity issue. For instance, the issue information 844 may be updated to indicate that the secondary infrastructure connection is no longer encountering the connectivity issue, and the information transfer logic 834 may make the determination based on the updated issue information. In accordance with this implementation, the connection monitoring logic 832 may generate (e.g., update) the suspension instruction 852 to instruct the information transfer logic 834 to discontinue suspending the use of the secondary infrastructure connection based on the issue information 844 indicating that the secondary infrastructure connection is no longer encountering the connectivity issue.

At step 408, use of the secondary infrastructure connection between the computing device and the second access point is automatically enabled. For instance, the use of the secondary infrastructure connection may be automatically enabled based on the determination that the secondary infrastructure connection no longer encounters the connectivity issue. In an example implementation, the information transfer logic 834 enables the use (e.g., discontinues suspension of the use) of the secondary infrastructure connection between the computing device 800 and the second access point. For example, the information transfer logic 834 may enable the use of the secondary infrastructure connection based on the suspend instruction 852 instructing the information transfer logic 834 to discontinue suspending the use of the secondary infrastructure connection.

Figure 5:
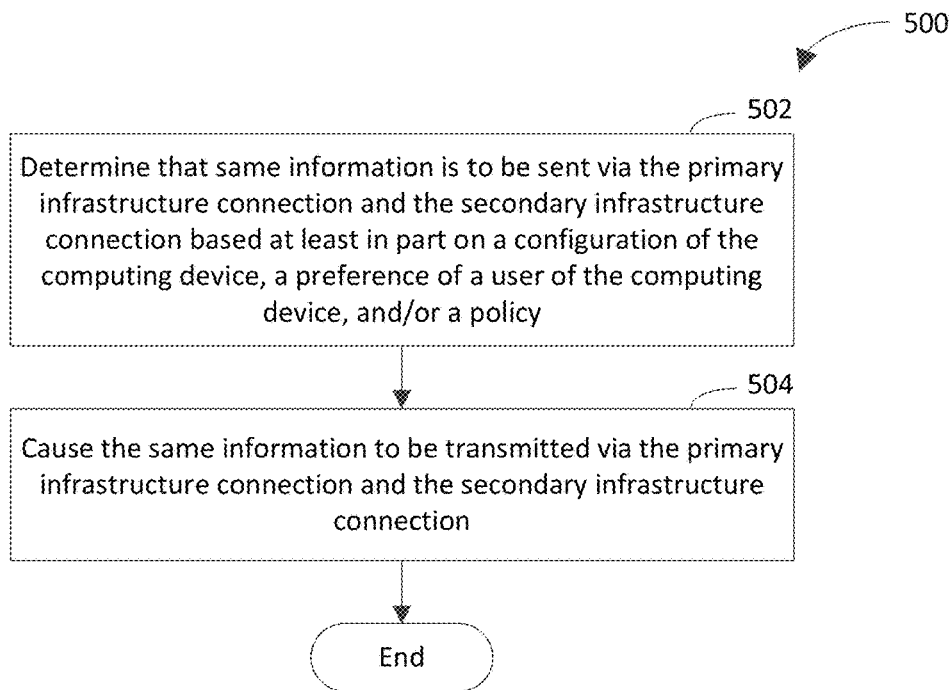

In yet another example embodiment, the method of flowchart 200 further includes one or more of the steps shown in flowchart 500 of FIG. 5. As shown in FIG. 5, the method of flowchart 500 begins at step 502. In step 502, a determination is made that same information is to be sent via the primary infrastructure connection and the secondary infrastructure connection based at least in part on a configuration of the computing device, a preference of a user of the computing device, and/or a policy. For example, the configuration of the computing device may include (e.g., be) a configuration of a hardware (e.g., OEM) component that is included in the computing device. In another example, the policy may include rules associated with transfer of information to or from an application, transfer of information within an enterprise, and so on. In accordance with this example, the determination at step 502 may be based at least in part on receipt of a request to send information to or from the application or receipt of a request to send information within the enterprise.

In an example implementation, the information transfer logic 834 determines that the same information is to be sent via the primary infrastructure connection 858 and the secondary infrastructure connection based at least in part on a configuration of the computing device 800, a preference of a user of the computing device 800, and/or a policy. For example, the transfer rules 846 may indicate which information (e.g., which types of information) is to be sent via each of the infrastructure connections (e.g., the primary infrastructure connection 858 and the secondary infrastructure connection(s) 860) that are established by the connection establishment logic 828. The transfer rules 846 may be set (e.g., created) based on the configuration of the computing device 800, the preference of a user of the computing device 800, and/or the policy. In accordance with this example, the information transfer logic 834 may review the transfer rules 846 to determine that the same information is to be sent via the primary infrastructure connection 858 and the secondary infrastructure connection.

At step 504, the same information is caused to be transmitted via the primary infrastructure connection and the secondary infrastructure connection. In an example implementation, the information transfer logic 834 causes the same information to be transmitted via the primary infrastructure connection 858 and the secondary infrastructure connection (e.g., based on the transfer rules 846 indicating that the same information is to be sent via the primary infrastructure connection 858 and the secondary infrastructure connection.

Figure 6:
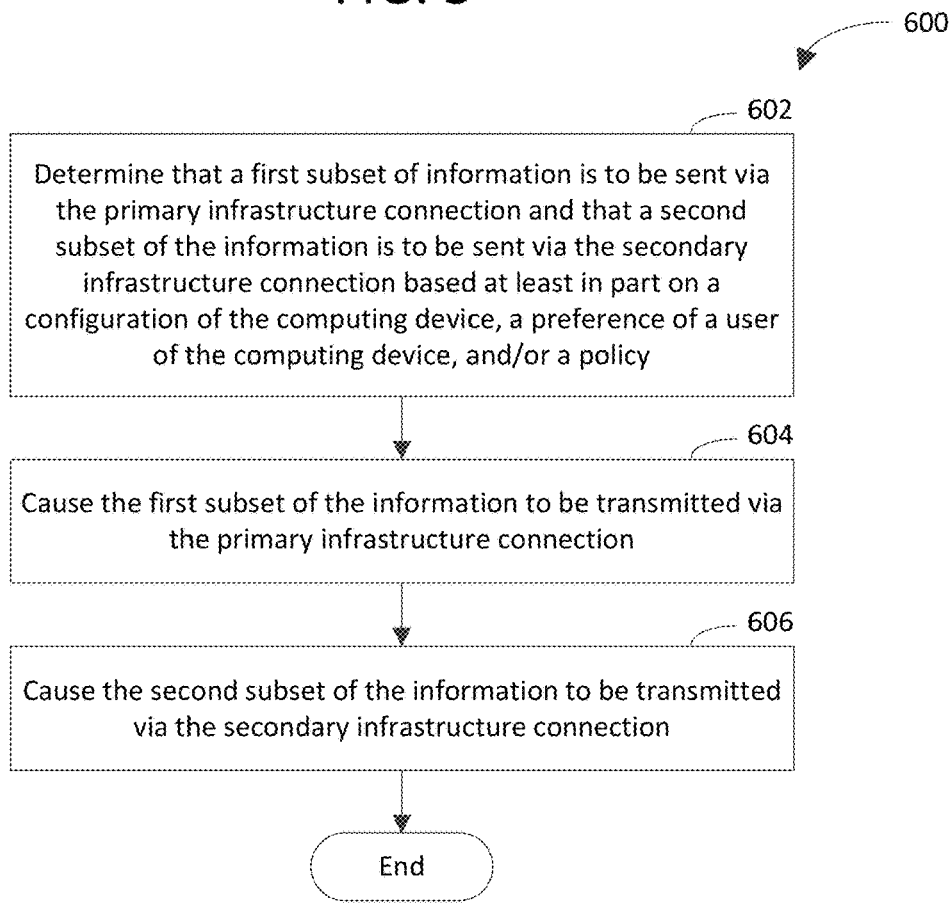

In still another example embodiment, the method of flowchart 200 further includes one or more of the steps shown in flowchart 600 of FIG. 6. As shown in FIG. 6, the method of flowchart 600 begins at step 602. In step 602, a determination is made that a first subset of information is to be sent via the primary infrastructure connection and that a second subset of the information is to be sent via the secondary infrastructure connection based at least in part on a configuration of the computing device, a preference of a user of the computing device, and/or a policy. The second subset of the information is different from the first subset of the information. For instance, the primary infrastructure connection and the secondary infrastructure connection may be independent from each other. For example, the first and second subsets of the information may be mutually exclusive. In another example, the first subset of the information may be of a first type, and the second subset of the information may be of a second type that is different from the first type. In accordance with this example, the first type may include (e.g., be) video, and the second type may include messaging (e.g., chat messages), background application updates, and/or file downloads. In yet another example, the first subset of the information may be selected for transmission via the primary infrastructure connection and the second subset of the information may be selected for transmission via the secondary infrastructure connection to increase (e.g., maximize) throughput of the information through the primary and secondary infrastructure connections. The throughput of the information through the primary and secondary infrastructure connections may be a quantity (e.g., proportion) of the information that is provided via the primary and secondary infrastructure connections per unit of time.

In an example implementation, the information transfer logic 834 determines that the first subset of the information 864 is to be sent via the primary infrastructure connection 858 and that the second subset of the information 864 is to be sent via the secondary infrastructure connection based at least in part on a configuration of the computing device 800, a preference of a user of the computing device 800, and/or a policy. The transfer rules 846 may indicate which of the information 864 is to be sent via each of the first infrastructure connection 858 and the secondary infrastructure connection. Accordingly, the information transfer logic 834 may make the determination based on the transfer rules 846 indicating that the first subset of the information 864 is to be sent via the primary infrastructure connection 858 and further indicating that the second subset of the information 864 is to be sent via the secondary infrastructure connection.

At step 604, the first subset of the information is caused to be transmitted via the primary infrastructure connection. In an example implementation, the information transfer logic 834 causes the first subset of the information 864 to be transmitted via the primary infrastructure connection 858 (e.g., based on the transfer rules 846 indicating that the first subset of the information 864 is to be transmitted via the primary infrastructure connection 858).

At step 606, the second subset of the information is caused to be transmitted via the secondary infrastructure connection. In an example implementation, the information transfer logic 834 causes the second subset of the information 864 to be transmitted via the secondary infrastructure connection (e.g., based on the transfer rules 846 indicating that the second subset of the information 864 is to be transmitted via the secondary infrastructure connection).

Figure 7:
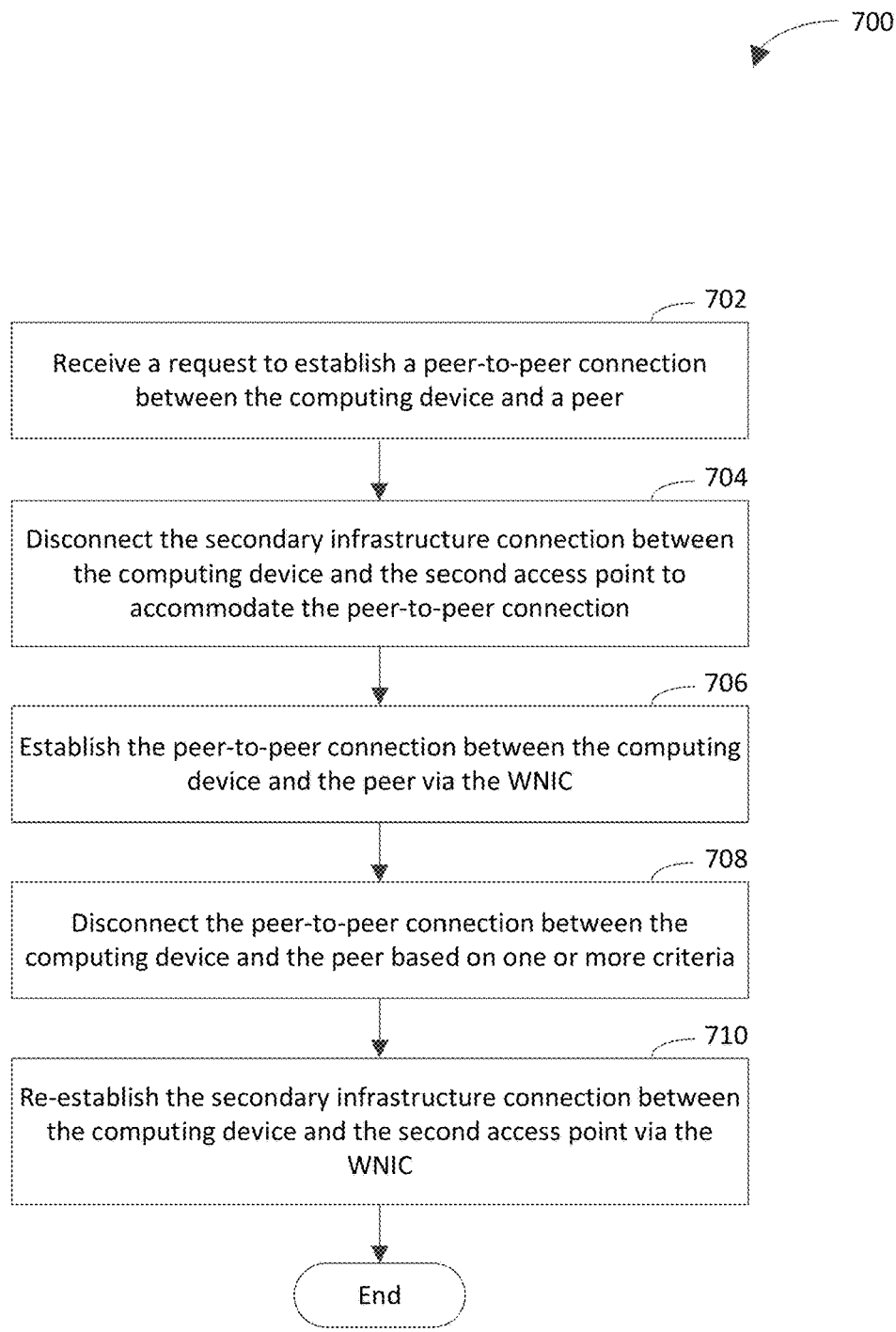
Figure 8:
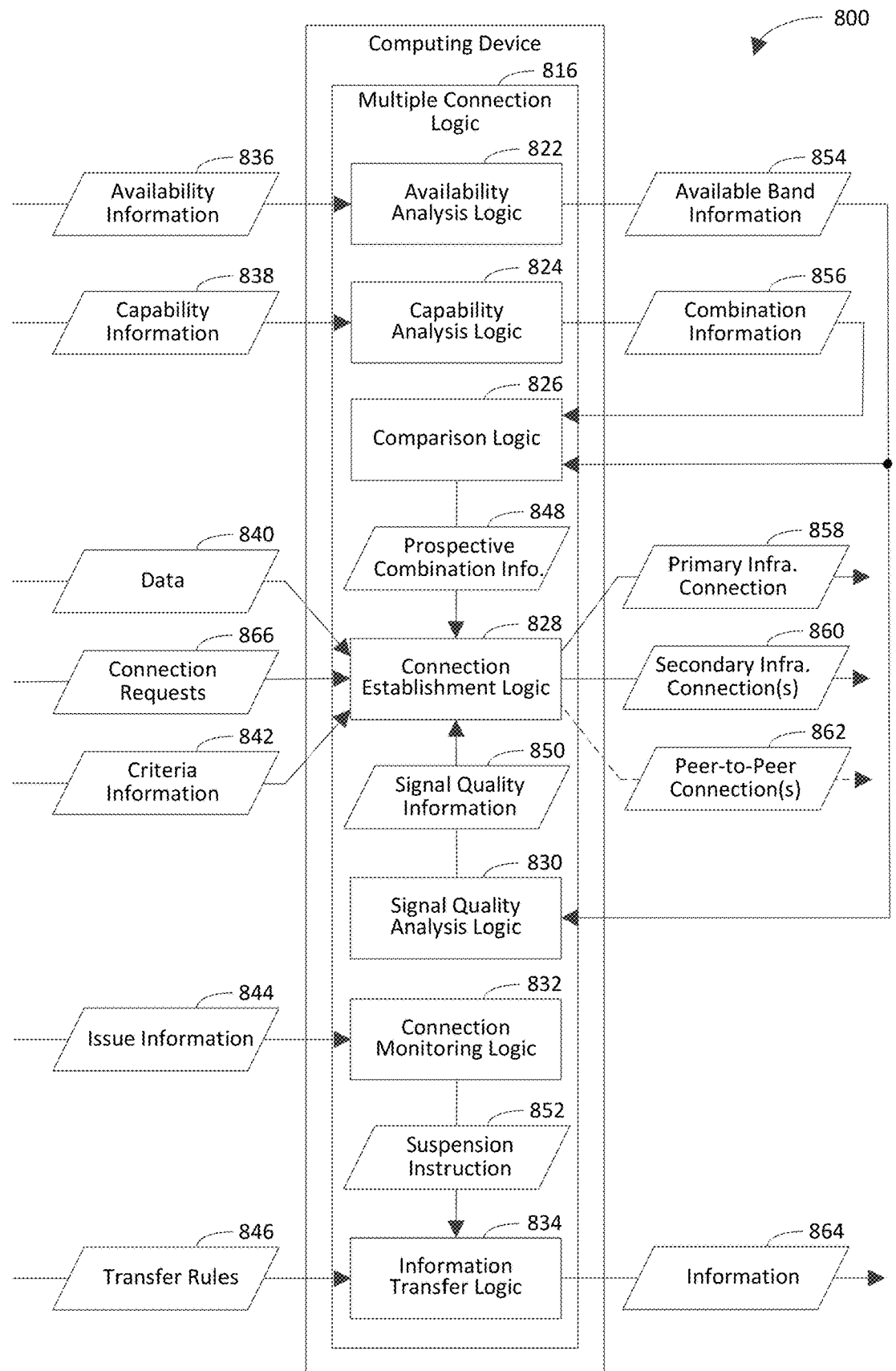
FIG. 8 is a block diagram of an example implementation of a computing device shown in FIG. 1 in accordance with an embodiment.

In another example embodiment, the method of flowchart 200 further includes one or more of the steps shown in flowchart 700 of FIG. 7. As shown in FIG. 7, the method of flowchart 700 begins at step 702. In step 702, a request to establish a peer-to-peer connection between the computing device and a peer is received. In an example implementation, the connection establishment logic 828 receives the request to establish the peer-to-peer connection between the computing device 800 and the peer. For instance, the request to establish the peer-to-peer connection may be include among connection requests 866.

At step 704, the secondary infrastructure connection between the computing device and the second access point is disconnected to accommodate the peer-to-peer connection (e.g., based at least in part on the request to establish the peer-to-peer connection). In an example implementation, the connection establishment logic 828 disconnects the secondary infrastructure connection between the computing device 800 and the second access point to accommodate the peer-to-peer connection.

At step 706, the peer-to-peer connection is established between the computing device and the peer via the WNIC (e.g., based at least in part on the secondary infrastructure connection being disconnected). In an example implementation, the connection establishment logic 828 establishes the peer-to-peer connection between the computing device 800 and the peer via the WNIC. For instance, the peer-to-peer connection may be included among peer-to-peer connection(s) 862.

At step 708, the peer-to-peer connection between the computing device and the peer is disconnected based on one or more criteria. Examples of such a criterion included but are not limited to use of the peer-to-peer connection being discontinued, a lapse of a designated (e.g., predetermined) period of time since the peer-to-peer connection was established, and the peer-to-peer connection encountering a connectivity issue. In an example implementation, the connection establishment logic 828 disconnects the peer-to-peer connection between the computing device 800 and the peer based on the one or more criteria. The instance, the connection establishment logic 828 may review criteria information 842 to identify the one or more criteria.

At step 710, the secondary infrastructure connection is re-established between the computing device and the second access point via the WNIC (e.g., based at least in part on the peer-to-peer connection being disconnected). In an example implementation, the connection establishment logic 828 re-establishes the secondary infrastructure connection between the computing device 800 and the second access point via the WNIC.

It will be recognized that the computing device 800 may not include one or more of the availability analysis logic 822, the capability analysis logic 824, the comparison logic 826, the connection establishment logic 828, the signal quality analysis logic 830, the connection monitoring logic 832, and/or the information transfer logic 834. Furthermore, the computing device 800 may include components in addition to or in lieu of the availability analysis logic 822, the capability analysis logic 824, the comparison logic 826, the connection establishment logic 828, the signal quality analysis logic 830, the connection monitoring logic 832, and/or the information transfer logic 834.

Figure 9:
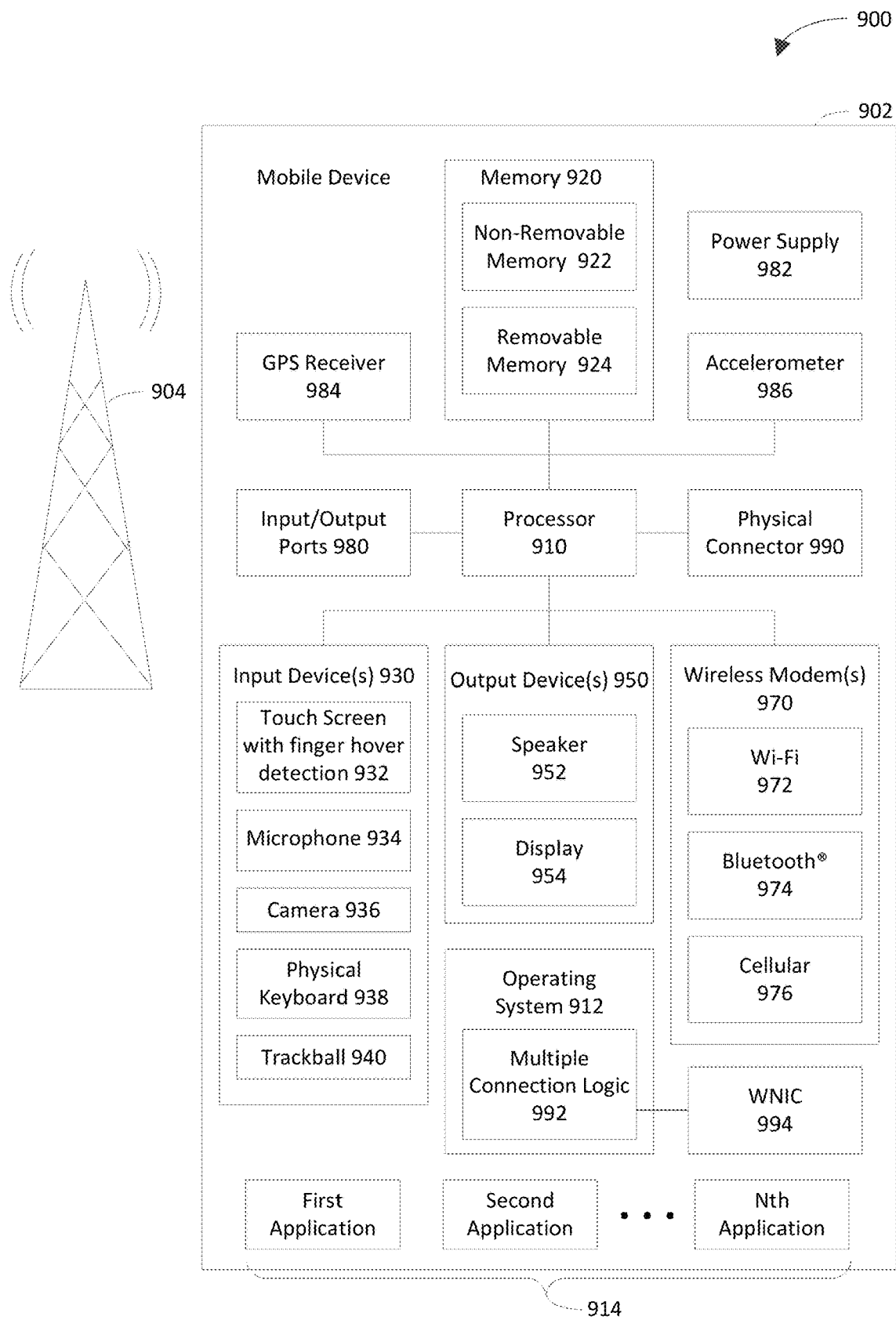
FIG. 9 is a system diagram of an exemplary mobile device in accordance with an embodiment.

FIG. 9 is a system diagram of an exemplary mobile device 900 including a variety of optional hardware and software components, shown generally as 902. Any components 902 in the mobile device may communicate with any other component, though not all connections are shown, for ease of illustration. The mobile device 900 may be any of a variety of computing devices (e.g., cell phone, smartphone, handheld computer, Personal Digital Assistant (PDA), etc.) and may allow wireless two-way communications with one or more mobile communications networks 904, such as a cellular or satellite network, or with a local area or wide area network.

The mobile device 900 may include a processor 910 (e.g., signal processor, microprocessor, ASIC, or other control and processing logic circuitry) for performing such tasks as signal coding, data processing, input/output processing, power control, and/or other functions. An operating system 912 may control the allocation and usage of the components 902 and support for one or more applications 914 (a.k.a. application programs). The applications 914 may include common mobile computing applications (e.g., email applications, calendars, contact managers, web browsers, messaging applications) and any other computing applications (e.g., word processing applications, mapping applications, media player applications).

The mobile device 900 may include memory 920. The memory 920 may include non-removable memory 922 and/or removable memory 924. The non-removable memory 922 may include RAM, ROM, flash memory, a hard disk, or other well-known memory storage technologies. The removable memory 924 may include flash memory or a Subscriber Identity Module (SIM) card, which is well known in GSM communication systems, or other well-known memory storage technologies, such as "smart cards." The memory 920 may store data and/or code for running the operating system 912 and the applications 914. Example data may include web pages, text, images, sound files, video data, or other data sets to be sent to and/or received from one or more network servers or other devices via one or more wired or wireless networks. Memory 920 may store a subscriber identifier, such as an International Mobile Subscriber Identity (IMSI), and an equipment identifier, such as an International Mobile Equipment Identifier (IMEI). Such identifiers may be transmitted to a network server to identify users and equipment.

The mobile device 900 may support one or more input devices 930, such as a touch screen 932, microphone 934, camera 936, physical keyboard 938 and/or trackball 940 and one or more output devices 950, such as a speaker 952 and a display 954. Touch screens, such as the touch screen 932, may detect input in different ways. For example, capacitive touch screens detect touch input when an object (e.g., a fingertip) distorts or interrupts an electrical current running across the surface. As another example, touch screens may use optical sensors to detect touch input when beams from the optical sensors are interrupted. Physical contact with the surface of the screen is not necessary for input to be detected by some touch screens. For example, the touch screen 932 may support a finger hover detection using capacitive sensing, as is well understood in the art. Other detection techniques may be used, including but not limited to camera-based detection and ultrasonic-based detection. To implement a finger hover, a user's finger is typically within a predetermined spaced distance above the touch screen, such as between 0.1 to 0.25 inches, or between 0.25 inches and 0.5 inches, or between 0.5 inches and 0.75 inches, or between 0.75 inches and 1 inch, or between 1 inch and 1.5 inches, etc.

Other possible output devices (not shown) may include piezoelectric or other haptic output devices. Some devices may serve more than one input/output function. For example, touch screen 932 and display 954 may be combined in a single input/output device. The input devices 930 may include a Natural User Interface (NUI). An NUI is any interface technology that enables a user to interact with a device in a "natural" manner, free from artificial constraints imposed by input devices such as mice, keyboards, remote controls, and the like. Examples of NUI methods include those relying on speech recognition, touch and stylus recognition, gesture recognition both on screen and adjacent to the screen, air gestures, head and eye tracking, voice and speech, vision, touch, gestures, and machine intelligence. Other examples of a NUI include motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (EEG and related methods). Thus, in one specific example, the operating system 912 or applications 914 may include speech-recognition software as part of a voice control interface that allows a user to operate the mobile device 900 via voice commands. Furthermore, the mobile device 900 may include input devices and software that allows for user interaction via a user's spatial gestures, such as detecting and interpreting gestures to provide input to a gaming application.

The operating system may include multiple connection logic 992. The multiple connection logic 992 is configured to establish multiple infrastructure connections between the mobile device 902 and multiple access points, which are external to the mobile device 902, via a single wireless network interface controller (WNIC) 994 in accordance with any one or more of the techniques described herein.

The WNIC 994 may be coupled to antenna(s) (not shown) and may support two-way communications between the multiple connection logic 992 and the aforementioned external access points in accordance with any one or more of the techniques described herein.

Wireless modem(s) 970 may be coupled to antenna(s) and may support two-way communications between the processor 910 and external devices, as is well understood in the art. The modem(s) 970 are shown generically and may include a cellular modem 976 for communicating with the mobile communication network 904 and/or other radio-based modems (e.g., Bluetooth® 974 and/or Wi-Fi 972). At least one of the wireless modem(s) 970 is typically configured for communication with one or more cellular networks, such as a GSM network for data and voice communications within a single cellular network, between cellular networks, or between the mobile device and a public switched telephone network (PSTN).

The mobile device may further include at least one input/output port 980, a power supply 982, a satellite navigation system receiver 984, such as a Global Positioning System (GPS) receiver, an accelerometer 986, and/or a physical connector 990, which may be a USB port, IEEE 1394 (FireWire) port, and/or RS-232 port. The illustrated components 902 are not required or all-inclusive, as any components may be deleted and other components may be added as would be recognized by one skilled in the art.

Although the operations of some of the disclosed methods are described in a particular, sequential order for convenient presentation, it should be understood that this manner of description encompasses rearrangement, unless a particular ordering is required by specific language set forth herein. For example, operations described sequentially may in some cases be rearranged or performed concurrently. Moreover, for the sake of simplicity, the attached figures may not show the various ways in which the disclosed methods may be used in conjunction with other methods.

Any one or more of the operating system module 112, the wireless network interface controller 114, the multiple connection logic 116, the multiple connection logic 816, the availability analysis logic 822, the capability analysis logic 824, the comparison logic 826, the connection establishment logic 828, the signal quality analysis logic 830, the connection monitoring logic 832, the information transfer logic 834, flowchart 200, flowchart 300, flowchart 400, flowchart 500, flowchart 600, and/or flowchart 700 may be implemented in hardware, software, firmware, or any combination thereof.

For example, any one or more of the operating system module 112, the wireless network interface controller 114, the multiple connection logic 116, the multiple connection logic 816, the availability analysis logic 822, the capability analysis logic 824, the comparison logic 826, the connection establishment logic 828, the signal quality analysis logic 830, the connection monitoring logic 832, the information transfer logic 834, flowchart 200, flowchart 300, flowchart 400, flowchart 500, flowchart 600, and/or flowchart 700 may be implemented, at least in part, as computer program code configured to be executed in one or more processors.

In another example, any one or more of the operating system module 112, the wireless network interface controller 114, the multiple connection logic 116, the multiple connection logic 816, the availability analysis logic 822, the capability analysis logic 824, the comparison logic 826, the connection establishment logic 828, the signal quality analysis logic 830, the connection monitoring logic 832, the information transfer logic 834, flowchart 200, flowchart 300, flowchart 400, flowchart 500, flowchart 600, and/or flowchart 700 may be implemented, at least in part, as hardware logic/electrical circuitry. Such hardware logic/electrical circuitry may include one or more hardware logic components. Examples of a hardware logic component include but are not limited to a field-programmable gate array (FPGA), an application-specific integrated circuit (ASIC), an application-specific standard product (ASSP), a system-on-a-chip system (SoC), a complex programmable logic device (CPLD), etc. For instance, a SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Figure 10:
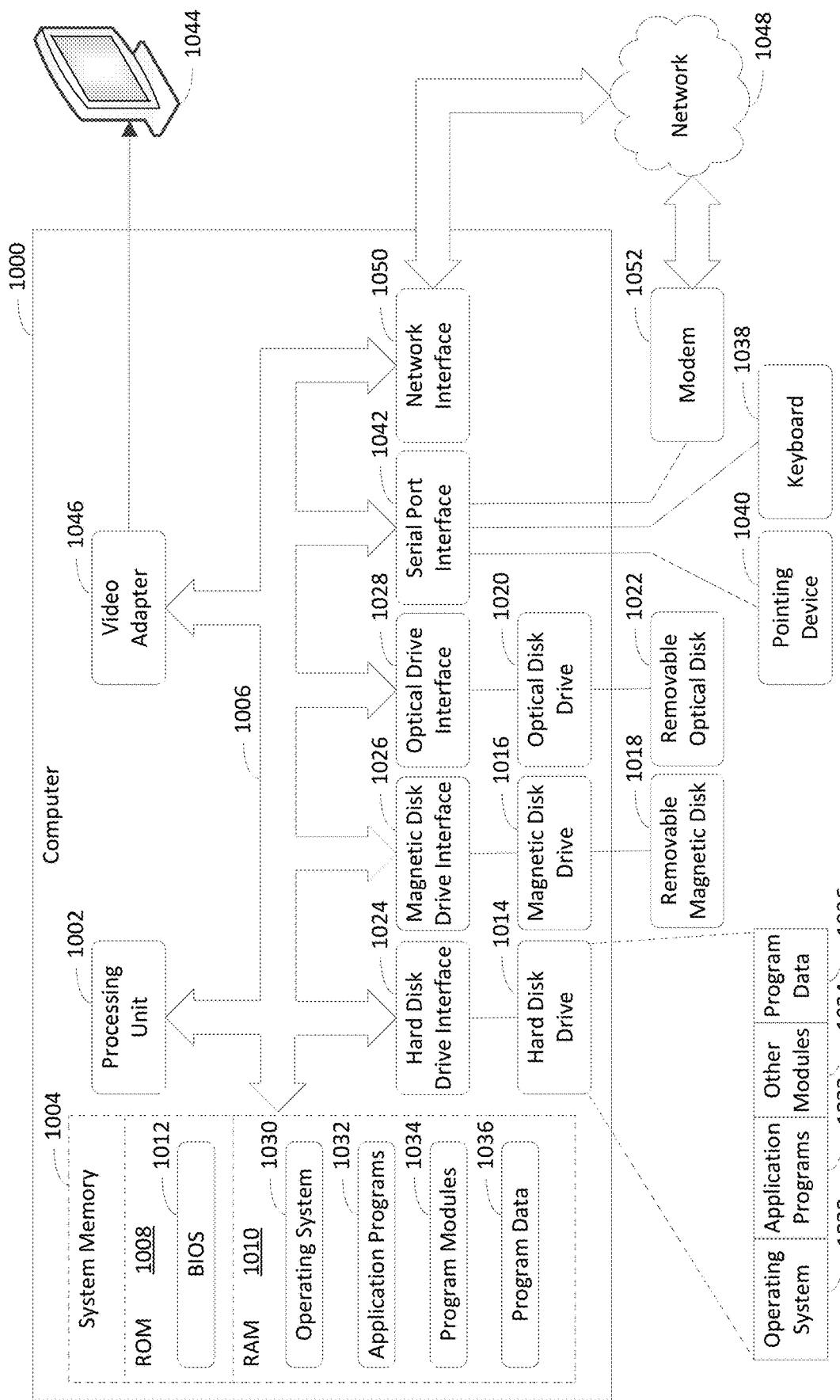
FIG. 10 depicts an example computer in which embodiments may be implemented.

III. Further Discussion of Some Example Embodiments (A1) An example computing device (FIG. 1, 102; FIG. 8, 800; FIG. 9, 902; FIG. 10, 1000) to establish multiple infrastructure connections to multiple access points (FIG. 1, 106A-106M) via a single wireless network interface controller (WNIC) (FIG. 1, 114; FIG. 9, 994) comprises the WNIC, a memory (FIG. 9, 920, 922; FIG. 10, 1004, 1008, 1010) storing an operating system (FIG. 1, 112; FIG. 9, 912; FIG. 10, 1030), and one or more processors (FIG. 9, 910; FIG. 10, 1002) coupled to the memory. The one or more processors are configured to execute the operating system. The operating system is configured to analyze (FIG. 2, 202) capability information (FIG. 8, 838), which indicates capabilities of the WNIC, to determine one or more combinations of identified frequency bands over which the WNIC is capable of communicating simultaneously. The operating system is further configured to analyze (FIG. 2, 204) availability information (FIG. 8, 836), which indicates available frequency bands that are available to connect the computing device to one or more of the access points, to determine signal qualities associated with the respective available frequency bands. The operating system is further configured to establish (FIG. 2, 206) a primary infrastructure connection (FIG. 8, 858) between the computing device and a first access point (FIG. 1, 106A) via the WNIC based at least in part on a first frequency band with which the first access point is associated being included among the identified frequency bands and being associated with a signal quality that is not less than a signal quality associated with each other available frequency band that is included in the identified frequency bands. The operating system is further configured to establish (FIG. 2, 208) a secondary infrastructure connection (FIG. 8, 860) between the computing device and a second access point (FIG. 1, 106B) via the WNIC, such that the primary and secondary infrastructure connections are operable simultaneously, based at least in part on a second frequency band with which the second access point is associated being included among the identified frequency bands in a combination that includes the first frequency band.

(A2) In the example computing device of A1, wherein the operating system is further configured to establish an other secondary infrastructure connection between the computing device and a third access point via the WNIC, such that the primary, secondary, and other secondary infrastructure connections are operable simultaneously, based at least in part on a third frequency band with which the third access point is associated being included among the identified frequency bands in the combination that includes the first frequency band and the second frequency band.

(A3) In the example computing device of any of A1-A2, wherein the capability information indicates, for the combination that includes the first frequency band and the second frequency band, a number of instances of each identified frequency band in the combination over which the WNIC is capable of communicating simultaneously; wherein the second and third frequency bands are same; and wherein the operating system is configured to establish the other secondary infrastructure connection between the computing device and the third access point via the WNIC, such that the primary, secondary, and other secondary infrastructure connections are operable simultaneously, based at least in part on the capability information indicating that the WNIC is capable of communicating over at least two instances of the second frequency band in the combination simultaneously.

(A4) In the example computing device of any of A1-A3, wherein the operating system is further configured to: analyze an updated version of the availability information to determine whether the link quality of the first frequency band is less than the link quality of the second frequency band; and as a result of the link quality of the first frequency band being less than the link quality of the second frequency band, perform the following operations: cause the primary infrastructure connection between the computing device and the first access point to be disconnected; cause the secondary infrastructure connection between the computing device and the second access point to be disconnected; re-establish the primary infrastructure connection to be between the computing device and the second access point via the WNIC; and re-establish the secondary infrastructure connection to be between the computing device and the first access point via the WNIC, such that the re-established primary infrastructure connection and the re-established secondary infrastructure connection are operable simultaneously.

(A5) In the example computing device of any of A1-A4, wherein the operating system is further configured to: determine whether the secondary infrastructure connection encounters a connectivity issue; suspend use of the secondary infrastructure connection between the computing device and the second access point as a result of a determination that the secondary infrastructure connection encounters the connectivity issue; determine whether the secondary infrastructure connection continues to encounter the connectivity issue; and automatically enable use of the secondary infrastructure connection between the computing device and the second access point as a result of the secondary infrastructure connection no longer encountering the connectivity issue.

(A6) In the example computing device of any of A1-A5, wherein the operating system is further configured to synchronize transfer of information via the primary infrastructure connection and transfer of the information via the secondary infrastructure connection.

(A7) In the example computing device of any of A1-A6, wherein the operating system is further configured to: determine that same information is to be sent via the primary infrastructure connection and the secondary infrastructure connection based at least in part on at least one of: a configuration of the computing device, a preference of a user of the computing device, or a policy; and cause the same information to be transmitted via the primary infrastructure connection and the secondary infrastructure connection.

(A8) In the example computing device of any of A1-A7, wherein the operating system is further configured to: determine that a first subset of information is to be sent via the primary infrastructure connection and that a second subset of the information, which is different from the first subset, is to be sent via the secondary infrastructure connection based at least in part on at least one of: a configuration of the computing device, a preference of a user of the computing device, or a policy; cause the first subset of the information to be transmitted via the primary infrastructure connection; and cause the second subset of the information to be transmitted via the secondary infrastructure connection.

(A9) In the example computing device of any of A1-A8, wherein the first and second access points are associated with a same wireless communication network.

(A10) In the example computing device of any of A1-A9, wherein the first access point is associated with a first wireless communication network, and wherein the second access point is associated with a second wireless communication network that is different from the first wireless communication network.

(A11) In the example computing device of any of A1-A10, wherein the operating system is configured to: establish the primary infrastructure connection using credentials of a user of the computing device; and establish the secondary infrastructure connection using the credentials of the user.

(A12) In the example computing device of any of A1-A11, wherein the operating system is configured to: establish the primary infrastructure connection using first credentials; and establish the secondary infrastructure connection using second credentials that are different from the first credentials.

(A13) In the example computing device of any of A1-A12, wherein the first access point is associated with a first wireless communication network of a specified network type; wherein the second access point is associated with a second wireless communication network of the specified network type; wherein the second wireless communication network is different from the first wireless communication network; and wherein the specified network type is a public network type, a private network type, an enterprise network type, or a non-enterprise network type.

(A14) In the example computing device of any of A1-A13, wherein the first access point is associated with a first wireless communication network of a first network type; wherein the second access point is associated with a second wireless communication network of a second network type that is different from the first network type; and wherein the first network type and the second network type are selected from the group consisting of (A) a public network type and a private network type or (B) an enterprise network type and a non-enterprise network type.

(A15) In the example computing device of any of A1-A14, wherein the capability information indicates whether the WNIC supports a low power state in which the secondary infrastructure connection remains in a low power state until the WNIC receives data to be transmitted via the secondary infrastructure connection or until the WNIC receives data corresponding to predefined data that is defined prior to the secondary infrastructure connection entering the low power state; and wherein the operating system is further configured to: maintain the secondary infrastructure connection in the low power state based at least in part on the capability information indicating that the WNIC supports the low power state.

(A16) In the example computing device of any of A1-A15, wherein the operating system is further configured to: disconnect the secondary infrastructure connection between the computing device and the second access point to accommodate a peer-to-peer connection between the computing device and a peer based at least in part on receipt of a request to establish the peer-to-peer connection; establish the peer-to-peer connection between the computing device and the peer via the WNIC based at least in part on the secondary infrastructure connection being disconnected; disconnect the peer-to-peer connection between the computing device and the peer based on one or more criteria; and re-establish the secondary infrastructure connection between the computing device and the second access point via the WNIC based at least in part on the peer-to-peer connection being disconnected.

(B1) An example method of establishing multiple infrastructure connections between a computing device (FIG. 1, 102; FIG. 8, 800; FIG. 9, 902; FIG. 10, 1000) and multiple access points (FIG. 1, 106A-106M) via a single wireless network interface controller (WNIC) (FIG. 1, 114; FIG. 9, 994), the method implemented by the computing device. The method comprises analyzing (FIG. 2, 202) capability information (FIG. 8, 838), which indicates capabilities of the WNIC, to determine one or more combinations of identified frequency bands over which the WNIC is capable of communicating simultaneously. The method further comprises analyzing (FIG. 2, 204) availability information (FIG. 8, 836), which indicates available frequency bands that are available to connect the computing device to one or more of the access points, to determine signal qualities associated with the respective available frequency bands. The method further comprises establishing (FIG. 2, 206) a primary infrastructure connection (FIG. 8, 858) between the computing device and a first access point (FIG. 1, 106A) via the WNIC based at least in part on a first frequency band with which the first access point is associated being included among the identified frequency bands and being associated with a signal quality that is not less than a signal quality associated with each other available frequency band that is included in the identified frequency bands. The method further comprises establishing (FIG. 2, 208) a secondary infrastructure connection (FIG. 8, 860) between the computing device and a second access point (FIG. 1, 106B) via the WNIC, such that the primary and secondary infrastructure connections are operable simultaneously, based at least in part on a second frequency band with which the second access point is associated being included among the identified frequency bands in a combination that includes the first frequency band.

(B2) In the method of B1, further comprising establishing an other secondary infrastructure connection between the computing device and a third access point via the WNIC, such that the primary, secondary, and other secondary infrastructure connections are operable simultaneously, based at least in part on a third frequency band with which the third access point is associated being included among the identified frequency bands in the combination that includes the first frequency band and the second frequency band.

(B3) In the method of any of B1-B2, wherein the capability information indicates, for the combination that includes the first frequency band and the second frequency band, a number of instances of each identified frequency band in the combination over which the WNIC is capable of communicating simultaneously; wherein the second and third frequency bands are same; and wherein establishing the other second infrastructure connection comprises: establishing the other secondary infrastructure connection between the computing device and the third access point via the WNIC, such that the primary, secondary, and other secondary infrastructure connections are operable simultaneously, based at least in part on the capability information indicating that the WNIC is capable of communicating over at least two instances of the second frequency band in the combination simultaneously.

(B4) In the method of any of B1-B3, further comprising: analyzing an updated version of the availability information to determine that the link quality of the first frequency band is less than the link quality of the second frequency band; and as a result of the link quality of the first frequency band being less than the link quality of the second frequency band, performing the following operations: cause the primary infrastructure connection between the computing device and the first access point to be disconnected; cause the secondary infrastructure connection between the computing device and the second access point to be disconnected; re-establishing the primary infrastructure connection to be between the computing device and the second access point via the WNIC; and re-establishing the secondary infrastructure connection to be between the computing device and the first access point via the WNIC, such that the re-established primary infrastructure connection and the re-established secondary infrastructure connection are operable simultaneously.

(B5) In the method of any of B1-B4, further comprising: determining that the secondary infrastructure connection encounters a connectivity issue; suspending use of the secondary infrastructure connection between the computing device and the second access point as a result of determining that the secondary infrastructure connection encounters the connectivity issue; determining that the secondary infrastructure connection no longer encounters the connectivity issue; and automatically enabling use of the secondary infrastructure connection between the computing device and the second access point as a result of determining that the secondary infrastructure connection no longer encounters the connectivity issue.

(B6) In the method of any of B1-B5, further comprising synchronizing transfer of information via the primary infrastructure connection and transfer of the information via the secondary infrastructure connection.

(B7) In the method of any of B1-B6, further comprising: determining that same information is to be sent via the primary infrastructure connection and the secondary infrastructure connection based at least in part on at least one of: a configuration of the computing device, a preference of a user of the computing device, or a policy; and causing the same information to be transmitted via the primary infrastructure connection and the secondary infrastructure connection.

(B8) In the method of any of B1-B7, further comprising: determining that a first subset of information is to be sent via the primary infrastructure connection and that a second subset of the information, which is different from the first subset, is to be sent via the secondary infrastructure connection based at least in part on at least one of: a configuration of the computing device, a preference of a user of the computing device, or a policy; causing the first subset of the information to be transmitted via the primary infrastructure connection; and causing the second subset of the information to be transmitted via the secondary infrastructure connection.

(B9) In the method of any of B1-B8, wherein the first and second access points are associated with a same wireless communication network.

(B10) In the method of any of B1-B9, wherein the first access point is associated with a first wireless communication network, and wherein the second access point is associated with a second wireless communication network that is different from the first wireless communication network.

(B11) In the method of any of B1-B10, wherein establishing the primary infrastructure connection comprises: establishing the primary infrastructure connection using credentials of a user of the computing device; and wherein establishing the secondary infrastructure connection comprises: establishing the secondary infrastructure connection using the credentials of the user.

(B12) In the method of any of B1-B11, wherein establishing the primary infrastructure connection comprises: establishing the primary infrastructure connection using first credentials; and wherein establishing the secondary infrastructure connection comprises: establishing the secondary infrastructure connection using second credentials that are different from the first credentials.

(B13) In the method of any of B1-B12, wherein the first access point is associated with a first wireless communication network of a specified network type; wherein the second access point is associated with a second wireless communication network of the specified network type; wherein the second wireless communication network is different from the first wireless communication network; and wherein the specified network type is a public network type, a private network type, an enterprise network type, or a non-enterprise network type.

(B14) In the method of any of B1-B13, wherein the first access point is associated with a first wireless communication network of a first network type; wherein the second access point is associated with a second wireless communication network of a second network type that is different from the first network type; and wherein the first network type and the second network type are selected from the group consisting of (A) a public network type and a private network type or (B) an enterprise network type and a non-enterprise network type.

(B15) In the method of any of B1-B14, wherein the capability information indicates whether the WNIC supports a low power state in which the secondary infrastructure connection remains in a low power state until the WNIC receives data to be transmitted via the secondary infrastructure connection or until the WNIC receives data corresponding to predefined data that is defined prior to the secondary infrastructure connection entering the low power state; and wherein the method further comprises: maintaining the secondary infrastructure connection in the low power state based at least in part on the capability information indicating that the WNIC supports the low power state.

(B16) In the method of any of B1-B15, further comprising: receiving a request to establish a peer-to-peer connection between the computing device and a peer; disconnecting the secondary infrastructure connection between the computing device and the second access point to accommodate the peer-to-peer connection based at least in part on the request to establish the peer-to-peer connection; establishing the peer-to-peer connection between the computing device and the peer via the WNIC based at least in part on the secondary infrastructure connection being disconnected; disconnecting the peer-to-peer connection between the computing device and the peer based on one or more criteria; and re-establishing the secondary infrastructure connection between the computing device and the second access point via the WNIC based at least in part on the peer-to-peer connection being disconnected.

(C1) An example computer program product (FIG. 9, 924; FIG. 10, 1018, 1022) comprising a computer-readable storage medium having instructions recorded thereon for enabling a processor-based computing device (FIG. 1, 102; FIG. 8, 800; FIG. 9, 902; FIG. 10, 1000) to establish multiple infrastructure connections between the computing device and multiple access points (FIG. 1, 106A-106M) via a single wireless network interface controller (WNIC) (FIG. 1, 114; FIG. 9, 994) by performing operations, the operations comprising: analyzing (FIG. 2, 202) capability information (FIG. 8, 838), which indicates capabilities of the WNIC, to determine one or more combinations of identified frequency bands over which the WNIC is capable of communicating simultaneously; analyzing (FIG. 2, 204) availability information (FIG. 8, 836), which indicates available frequency bands that are available to connect the computing device to one or more of the access points, to determine signal qualities associated with the respective available frequency bands; establishing (FIG. 2, 206) a primary infrastructure connection (FIG. 8, 858) between the computing device and a first access point (FIG. 1, 106A) via the WNIC based at least in part on a first frequency band with which the first access point is associated being included among the identified frequency bands and being associated with a signal quality that is not less than a signal quality associated with each other available frequency band that is included in the identified frequency bands; and establishing (FIG. 2, 208) a secondary infrastructure connection (FIG. 8, 860) between the computing device and a second access point (FIG. 1, 106B) via the WNIC, such that the primary and secondary infrastructure connections are operable simultaneously, based at least in part on a second frequency band with which the second access point is associated being included among the identified frequency bands in a combination that includes the first frequency band.

IV. Example Computer System

FIG. 10 depicts an example computer 1000 in which embodiments may be implemented. The computing device 102, any one or more of the access points 106A-106M, and/or any one or more of the servers 110A-110N shown in FIG. 1 and/or the computing device 800 shown in FIG. 8 may be implemented using computer 1000, including one or more features of computer 1000 and/or alternative features. Computer 1000 may be a general-purpose computing device in the form of a conventional personal computer, a mobile computer, or a workstation, for example, or computer 1000 may be a special purpose computing device. The description of computer 1000 provided herein is provided for purposes of illustration, and is not intended to be limiting. Embodiments may be implemented in further types of computer systems, as would be known to persons skilled in the relevant art(s).

As shown in FIG. 10, computer 1000 includes a processing unit 1002, a system memory 1004, and a bus 1006 that couples various system components including system memory 1004 to processing unit 1002. Bus 1006 represents one or more of any of several types of bus structures, including a memory bus or memory controller, a peripheral bus, an accelerated graphics port, and a processor or local bus using any of a variety of bus architectures. System memory 1004 includes read only memory (ROM) 1008 and random access memory (RAM) 1010. A basic input/output system 1012 (BIOS) is stored in ROM 1008.

Computer 1000 also has one or more of the following drives: a hard disk drive 1014 for reading from and writing to a hard disk, a magnetic disk drive 1016 for reading from or writing to a removable magnetic disk 1018, and an optical disk drive 1020 for reading from or writing to a removable optical disk 1022 such as a CD ROM, DVD ROM, or other optical media. Hard disk drive 1014, magnetic disk drive 1016, and optical disk drive 1020 are connected to bus 1006 by a hard disk drive interface 1024, a magnetic disk drive interface 1026, and an optical drive interface 1028, respectively. The drives and their associated computer-readable storage media provide nonvolatile storage of computer-readable instructions, data structures, program modules and other data for the computer. Although a hard disk, a removable magnetic disk and a removable optical disk are described, other types of computer-readable storage media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 1030, one or more application programs 1032, other program modules 1034, and program data 1036. Application programs 1032 or program modules 1034 may include, for example, computer program logic for implementing any one or more of (e.g., at least a portion of) the operating system module 112, the wireless network interface controller 114, the multiple connection logic 116, the multiple connection logic 816, the availability analysis logic 822, the capability analysis logic 824, the comparison logic 826, the connection establishment logic 828, the signal quality analysis logic 830, the connection monitoring logic 832, the information transfer logic 834, flowchart 200 (including any step of flowchart 200), flowchart 300 (including any step of flowchart 300), flowchart 400 (including any step of flowchart 400), flowchart 500 (including any step of flowchart 500), flowchart 600 (including any step of flowchart 600), and/or flowchart 700 (including any step of flowchart 700), as described herein.

A user may enter commands and information into the computer 1000 through input devices such as keyboard 1038 and pointing device 1040. Other input devices (not shown) may include a microphone, joystick, game pad, satellite dish, scanner, touch screen, camera, accelerometer, gyroscope, or the like. These and other input devices are often connected to the processing unit 1002 through a serial port interface 1042 that is coupled to bus 1006, but may be connected by other interfaces, such as a parallel port, game port, or a universal serial bus (USB).

A display device 1044 (e.g., a monitor) is also connected to bus 1006 via an interface, such as a video adapter 1046. In addition to display device 1044, computer 1000 may include other peripheral output devices (not shown) such as speakers and printers.

Computer 1000 is connected to a network 1048 (e.g., the Internet) through a network interface or adapter 1050 (e.g., a WNIC), a modem 1052, or other means for establishing communications over the network. Modem 1052, which may be internal or external, is connected to bus 1006 via serial port interface 1042.

As used herein, the terms "computer program medium" and "computer-readable storage medium" are used to generally refer to media (e.g., non-transitory media) such as the hard disk associated with hard disk drive 1014, removable magnetic disk 1018, removable optical disk 1022, as well as other media such as flash memory cards, digital video disks, random access memories (RAMs), read only memories (ROM), and the like. A computer-readable storage medium is not a signal, such as a carrier signal or a propagating signal. For instance, a computer-readable storage medium may not include a signal. Accordingly, a computer-readable storage medium does not constitute a signal per se. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Example embodiments are also directed to such communication media.

As noted above, computer programs and modules (including application programs 1032 and other program modules 1034) may be stored on the hard disk, magnetic disk, optical disk, ROM, or RAM. Such computer programs may also be received via network interface 1050 or serial port interface 1042. Such computer programs, when executed or loaded by an application, enable computer 1000 to implement features of embodiments discussed herein. Accordingly, such computer programs represent controllers of the computer 1000.

Example embodiments are also directed to computer program products comprising software (e.g., computer-readable instructions) stored on any computer-useable medium. Such software, when executed in one or more data processing devices, causes data processing device(s) to operate as described herein. Embodiments may employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMS-based storage devices, nanotechnology-based storage devices, and the like.

It will be recognized that the disclosed technologies are not limited to any particular computer or type of hardware. Certain details of suitable computers and hardware are well known and need not be set forth in detail in this disclosure.

V. Conclusion

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

What is claimed is:

1. A computing device to establish multiple infrastructure connections to multiple access points via a single wireless network interface controller (WNIC), the computing device comprising:
the WNIC;
a memory storing an operating system; and
one or more processors coupled to the memory, the one or more processors configured to execute the operating system, the operating system configured to:
analyze capability information, which indicates capabilities of the WNIC, to determine one or more combinations of identified frequency bands over which the WNIC is capable of communicating simultaneously;
analyze availability information, which indicates available frequency bands that are available to connect the computing device to one or more of the access points, to determine signal qualities associated with the respective available frequency bands;
establish a primary infrastructure connection between the computing device and a first access point via the WNIC based at least in part on a first frequency band with which the first access point is associated being included among the identified frequency bands and being associated with a signal quality that is not less than a signal quality associated with each other available frequency band that is included in the identified frequency bands;
confirm that the computing device is not connected on a maximum number of frequency bands that are allowed; and
establish a secondary infrastructure connection between the computing device and a second access point via the WNIC, such that the primary and secondary infrastructure connections are operable simultaneously, based at least in part on the computing device not being connected on the maximum number of frequency bands that are allowed and further based at least in part on a second frequency band with which the second access point is associated being included among the identified frequency bands in the combination over which the WNIC is capable of communicating simultaneously.

2. The computing device of claim 1, wherein the operating system is further configured to:
establish an other secondary infrastructure connection between the computing device and a third access point via the WNIC, such that the primary, secondary, and other secondary infrastructure connections are operable simultaneously, based at least in part on a third frequency band with which the third access point is associated being included among the identified frequency bands in the combination that includes the first frequency band and the second frequency band.

3. The computing device of claim 2, wherein the capability information indicates a number of instances of each identified frequency band in the combination over which the WNIC is capable of communicating simultaneously;
wherein the second and third frequency bands are same; and
wherein the operating system is configured to:
establish the other secondary infrastructure connection between the computing device and the third access point via the WNIC, such that the primary, secondary, and other secondary infrastructure connections are operable simultaneously, based at least in part on the capability information indicating that the WNIC is capable of communicating over at least two instances of the second frequency band in the combination simultaneously.

4. The computing device of claim 1, wherein the operating system is further configured to:
analyze an updated version of the availability information to determine whether the link quality of the first frequency band is less than the link quality of the second frequency band; and
as a result of the link quality of the first frequency band being less than the link quality of the second frequency band, perform the following operations:
cause the primary infrastructure connection between the computing device and the first access point to be disconnected;
cause the secondary infrastructure connection between the computing device and the second access point to be disconnected;
re-establish the primary infrastructure connection to be between the computing device and the second access point via the WNIC; and
re-establish the secondary infrastructure connection to be between the computing device and the first access point via the WNIC, such that the re-established primary infrastructure connection and the re-established secondary infrastructure connection are operable simultaneously.

5. The computing device of claim 1, wherein the operating system is further configured to:
determine whether the secondary infrastructure connection encounters a connectivity issue;
suspend use of the secondary infrastructure connection between the computing device and the second access point as a result of a determination that the secondary infrastructure connection encounters the connectivity issue;
determine whether the secondary infrastructure connection continues to encounter the connectivity issue; and
automatically enable use of the secondary infrastructure connection between the computing device and the second access point as a result of the secondary infrastructure connection no longer encountering the connectivity issue.

6. The computing device of claim 1, wherein the operating system is further configured to:
determine that same information is to be sent via the primary infrastructure connection and the secondary infrastructure connection based at least in part on at least one of:
a configuration of the computing device,
a preference of a user of the computing device, or
a policy; and
cause the same information to be transmitted via the primary infrastructure connection and the secondary infrastructure connection.

7. The computing device of claim 1, wherein the operating system is further configured to:
determine that a first subset of information is to be sent via the primary infrastructure connection and that a second subset of the information, which is different from the first subset, is to be sent via the secondary infrastructure connection based at least in part on at least one of:
  a configuration of the computing device,
  a preference of a user of the computing device, or
  a policy;
cause the first subset of the information to be transmitted via the primary infrastructure connection; and
cause the second subset of the information to be transmitted via the secondary infrastructure connection.

8. The computing device of claim 1, wherein the first and second access points are associated with a same wireless communication network.

9. The computing device of claim 1, wherein the first access point is associated with a first wireless communication network of a specified network type;
  wherein the second access point is associated with a second wireless communication network of the specified network type;
  wherein the second wireless communication network is different from the first wireless communication network; and
  wherein the specified network type is a public network type, a private network type, an enterprise network type, or a non-enterprise network type.

10. The computing device of claim 1, wherein the first access point is associated with a first wireless communication network of a first network type;
  wherein the second access point is associated with a second wireless communication network of a second network type that is different from the first network type; and
  wherein:
    the first network type is a public network type, and the second network type is a private network type;
    the first network type is the private network type, and the second network type is the public network type;
    the first network type is an enterprise network type, and the second network type is a non-enterprise network type; or
    the first network type is the non-enterprise network type, and the second network type is the enterprise network type.

11. A method of establishing multiple infrastructure connections between a computing device and multiple access points via a single wireless network interface controller (WNIC), the method implemented by the computing device, the method comprising:
  analyzing capability information, which indicates capabilities of the WNIC, to determine one or more combinations of identified frequency bands over which the WNIC is capable of communicating simultaneously;
  analyzing availability information, which indicates available frequency bands that are available to connect the computing device to one or more of the access points, to determine signal qualities associated with the respective available frequency bands;
  establishing a primary infrastructure connection between the computing device and a first access point via the WNIC based at least in part on a first frequency band with which the first access point is associated being included among the identified frequency bands and being associated with a signal quality that is not less than a signal quality associated with each other available frequency band that is included in the identified frequency bands;
  confirming that the computing device is not connected on a maximum number of frequency bands that are allowed; and
  establishing a secondary infrastructure connection between the computing device and a second access point via the WNIC, such that the primary and secondary infrastructure connections are operable simultaneously, based at least in part on the computing device not being connected on the maximum number of frequency bands that are allowed and further based at least in part on a second frequency band with which the second access point is associated being included among the identified frequency bands in the combination over which the WNIC is capable of communicating simultaneously.

12. The method of claim 11, further comprising:
  establishing an other secondary infrastructure connection between the computing device and a third access point via the WNIC, such that the primary, secondary, and other secondary infrastructure connections are operable simultaneously, based at least in part on a third frequency band with which the third access point is associated being included among the identified frequency bands in the combination that includes the first frequency band and the second frequency band.

13. The method of claim 12, wherein the capability information indicates a number of instances of each identified frequency band in the combination over which the WNIC is capable of communicating simultaneously;
  wherein the second and third frequency bands are same; and
  wherein establishing the other second infrastructure connection comprises:
    establishing the other secondary infrastructure connection between the computing device and the third access point via the WNIC, such that the primary, secondary, and other secondary infrastructure connections are operable simultaneously, based at least in part on the capability information indicating that the WNIC is capable of communicating over at least two instances of the second frequency band in the combination simultaneously.

14. The method of claim 11, further comprising:
  synchronizing transfer of information via the primary infrastructure connection and transfer of the information via the secondary infrastructure connection.

15. The method of claim 11, wherein establishing the primary infrastructure connection comprises:
  establishing the primary infrastructure connection using credentials of a user of the computing device; and
  wherein establishing the secondary infrastructure connection comprises:
    establishing the secondary infrastructure connection using the credentials of the user.

16. The method of claim 11, wherein establishing the primary infrastructure connection comprises:
  establishing the primary infrastructure connection using first credentials; and
  wherein establishing the secondary infrastructure connection comprises:
    establishing the secondary infrastructure connection using second credentials that are different from the first credentials.

17. The method of claim 11, wherein the capability information indicates whether the WNIC supports a low power state in which the secondary infrastructure connection remains in a low power state until the WNIC receives data to be transmitted via the secondary infrastructure connection or until the WNIC receives data corresponding to predefined data that is defined prior to the secondary infrastructure connection entering the low power state; and wherein the method further comprises:

maintaining the secondary infrastructure connection in the low power state based at least in part on the capability information indicating that the WNIC supports the low power state.

18. The method of claim 11, further comprising:

receiving a request to establish a peer-to-peer connection between the computing device and a peer;

disconnecting the secondary infrastructure connection between the computing device and the second access point to accommodate the peer-to-peer connection based at least in part on the request to establish the peer-to-peer connection;

establishing the peer-to-peer connection between the computing device and the peer via the WNIC based at least in part on the secondary infrastructure connection being disconnected;

disconnecting the peer-to-peer connection between the computing device and the peer based on one or more criteria; and re-establishing the secondary infrastructure connection between the computing device and the second access point via the WNIC based at least in part on the peer-to-peer connection being disconnected.

19. A computer program product comprising a computer-readable storage medium having instructions recorded thereon for enabling a processor-based computing device to establish multiple infrastructure connections between the computing device and multiple access points via a single wireless network interface controller (WNIC) by performing operations, the operations comprising:

analyzing capability information, which indicates capabilities of the WNIC, to determine one or more combinations of identified frequency bands over which the WNIC is capable of communicating simultaneously;

analyzing availability information, which indicates available frequency bands that are available to connect the computing device to one or more of the access points, to determine signal qualities associated with the respective available frequency bands;

establishing a primary infrastructure connection between the computing device and a first access point via the WNIC based at least in part on a first frequency band with which the first access point is associated being included among the identified frequency bands and being associated with a signal quality that is not less than a signal quality associated with each other available frequency band that is included in the identified frequency bands;

confirming that an application that executes on the computing device is capable of supporting multiple paths to a server, which are defined by respective frequency bands, simultaneously and that the application has indicated that the application is available to connect over a secondary interface that is usable to establish an infrastructure connection; and establishing a secondary infrastructure connection between the computing device and a second access point via the WNIC, such that the primary and secondary infrastructure connections are operable simultaneously, based at least in part on confirmation that the application is capable of supporting multiple paths to the server simultaneously and that the application has indicated that the application is available to connect over the secondary interface and further based at least in part on a second frequency band with which the second access point is associated being included among the identified frequency bands in the combination over which the WNIC is capable of communicating simultaneously.

20. The computer program product of claim 19, wherein the operations further comprise:

confirming that the application requests multi-channel connectivity based at least on an opcode value associated with the application being set to true and further based at least on a handle of the application, which is opened prior to the opcode value being set to true, remaining open after the opcode value associated with the application is set to true.

* * * * *